Figure 6:
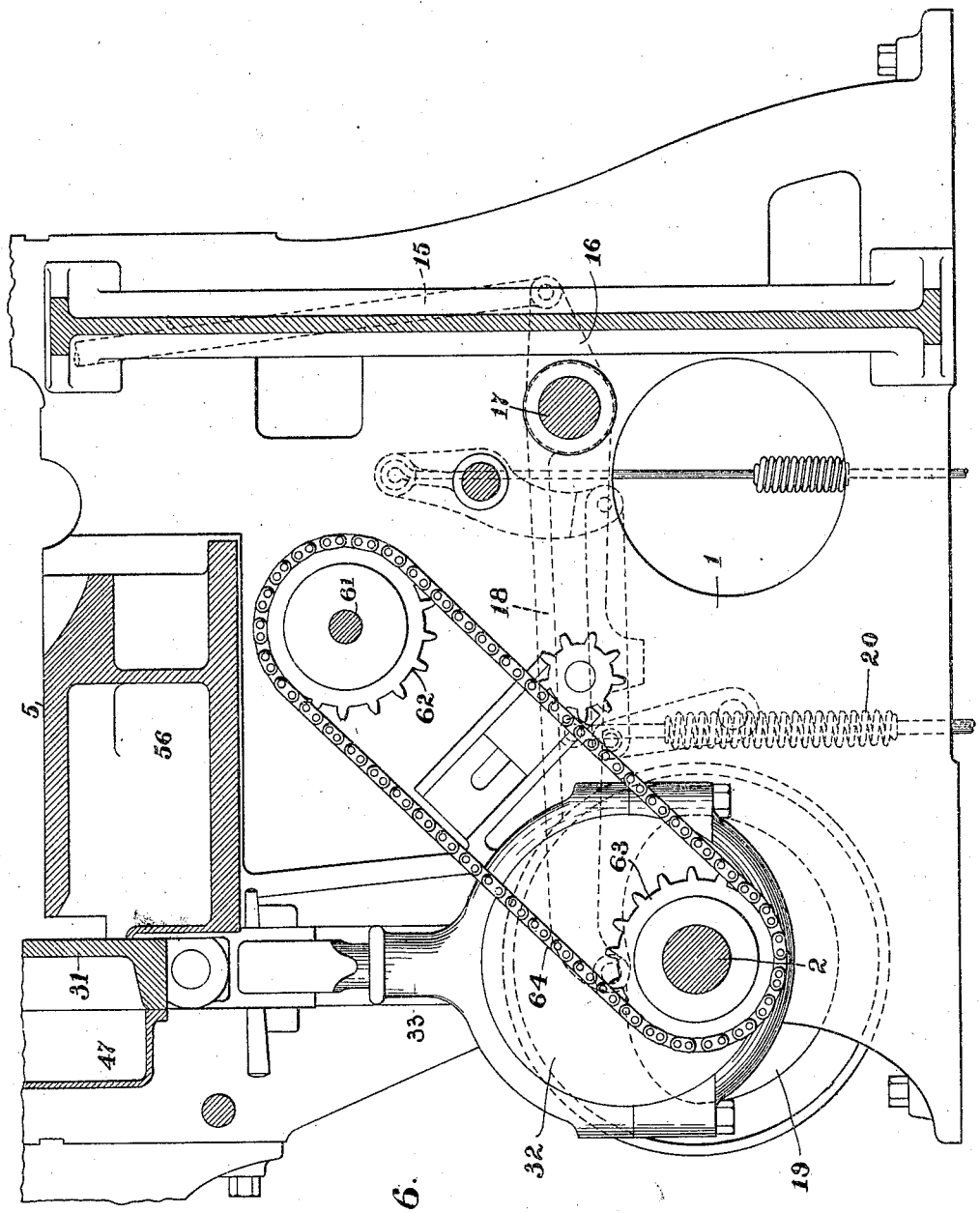

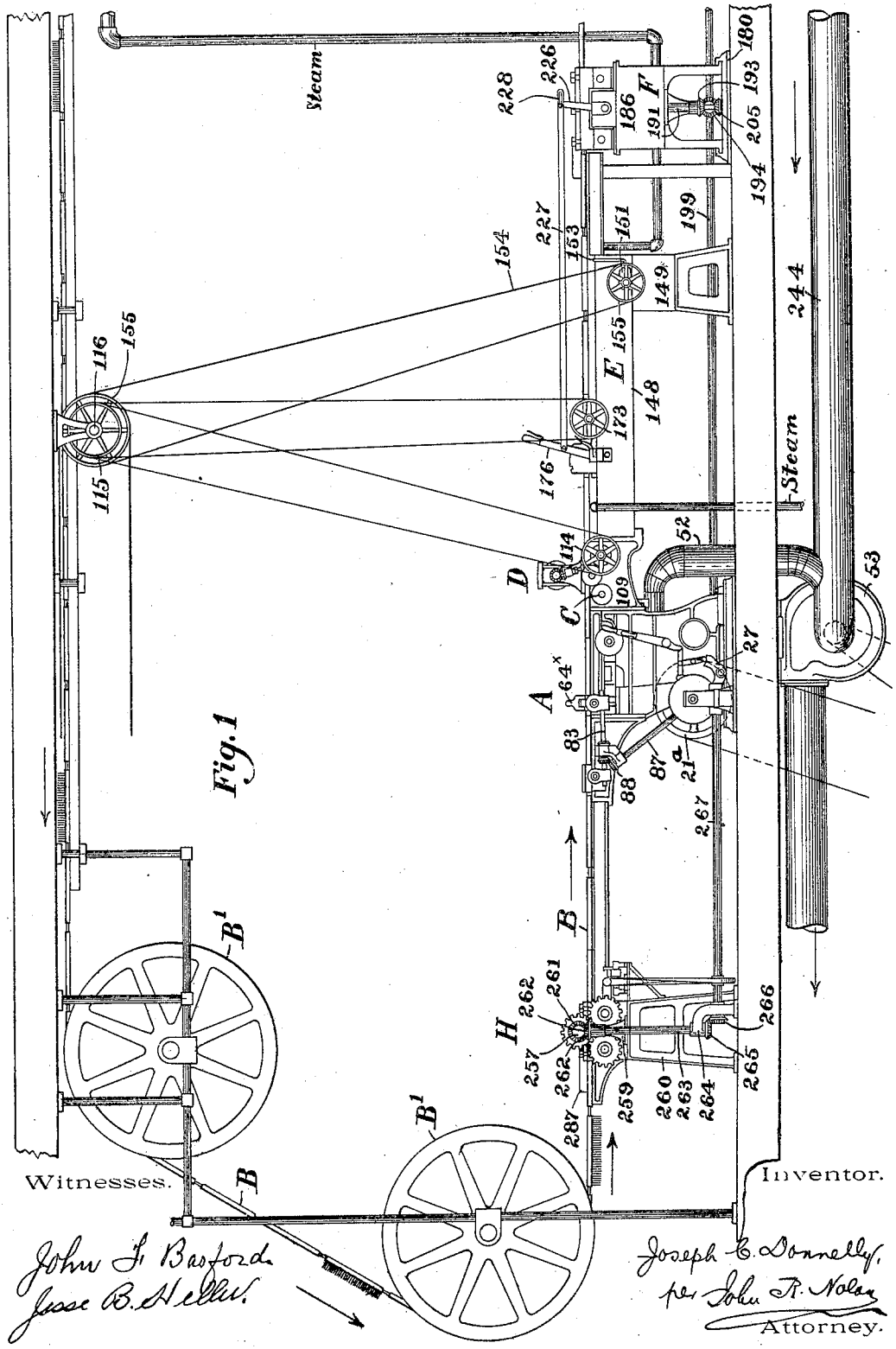

No. 778,953. PATENTED JAN. 3, 1905.
J. C. DONNELLY.
MATCH MAKING MACHINE.
APPLICATION FILED AUG. 26, 1897.
24 SHEETS—SHEET 2.
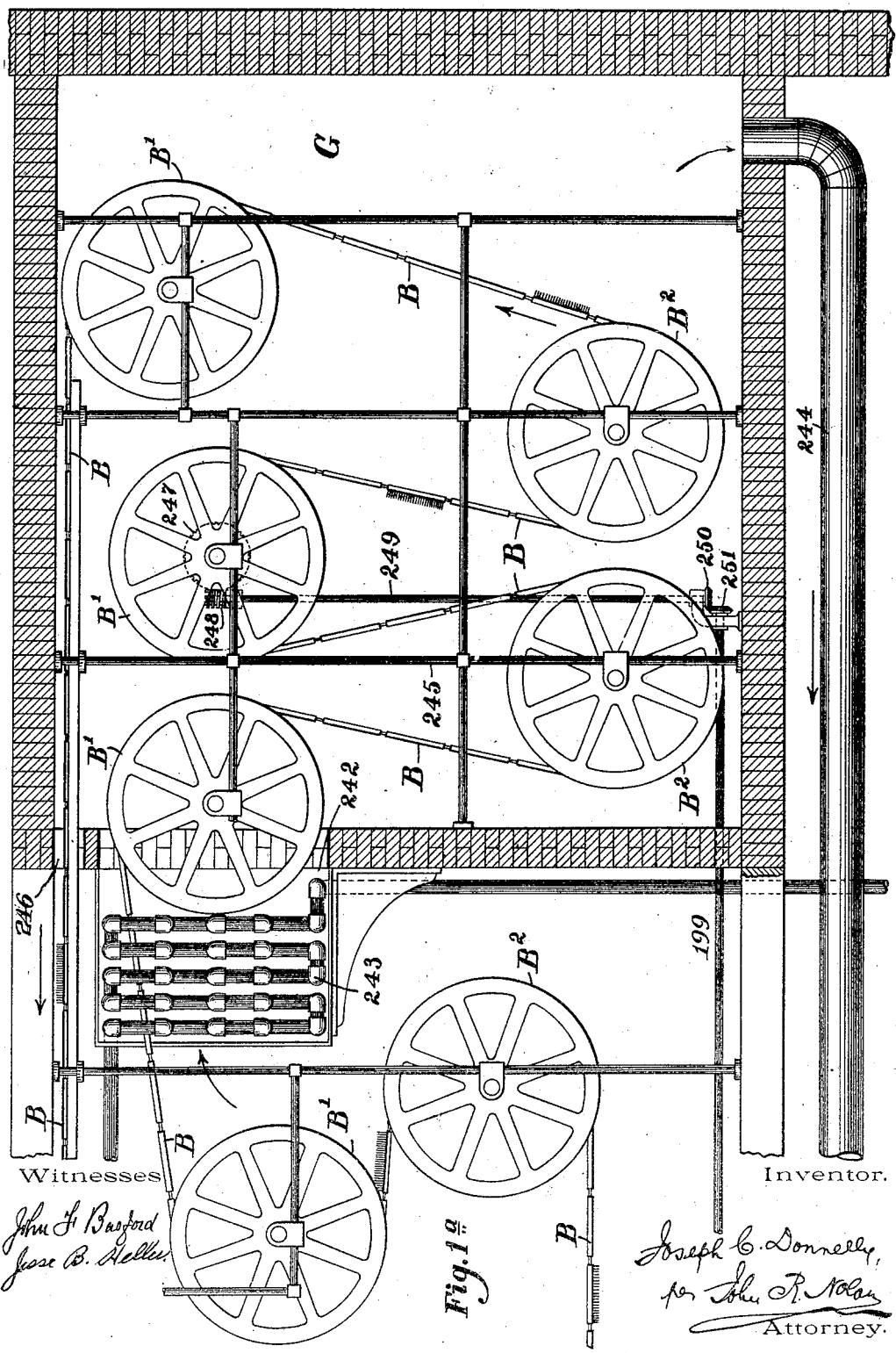
Witnesses
John F. Basford
Jesse B. Heller
Inventor.
Joseph C. Donnelly,
per John R. Nolan
Attorney.

No. 778,953. PATENTED JAN. 3, 1905.
J. C. DONNELLY.
MATCH MAKING MACHINE.
APPLICATION FILED AUG. 26, 1897.
24 SHEETS—SHEET 3.
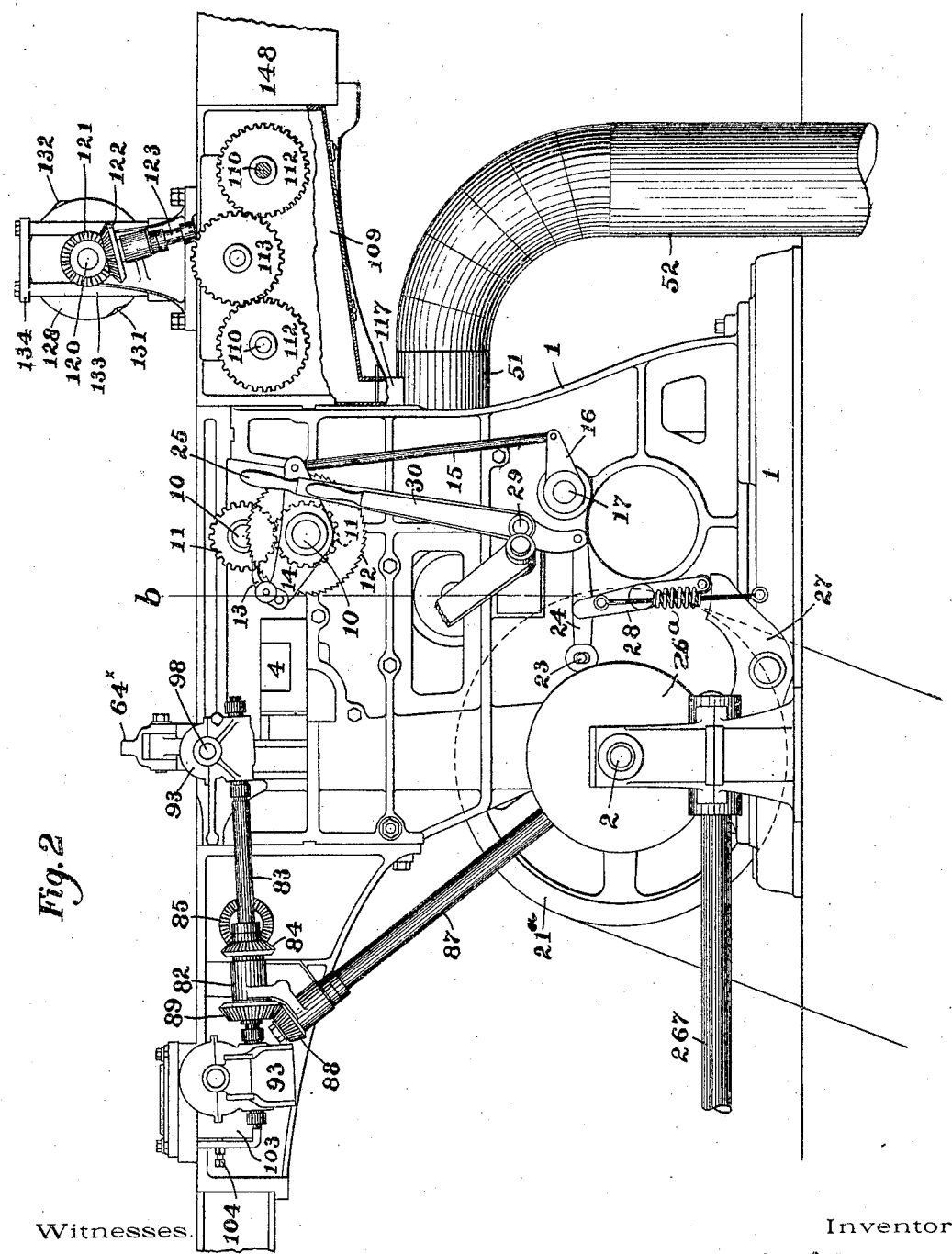
Witnesses
John F. Basford
Jesse B. H. Ellis
Inventor.
Joseph C. Donnelly,
per John R. Nolan
Attorney.

No. 778,953. PATENTED JAN. 3, 1905.
J. C. DONNELLY.
MATCH MAKING MACHINE.
APPLICATION FILED AUG. 26, 1897.
24 SHEETS—SHEET 4.
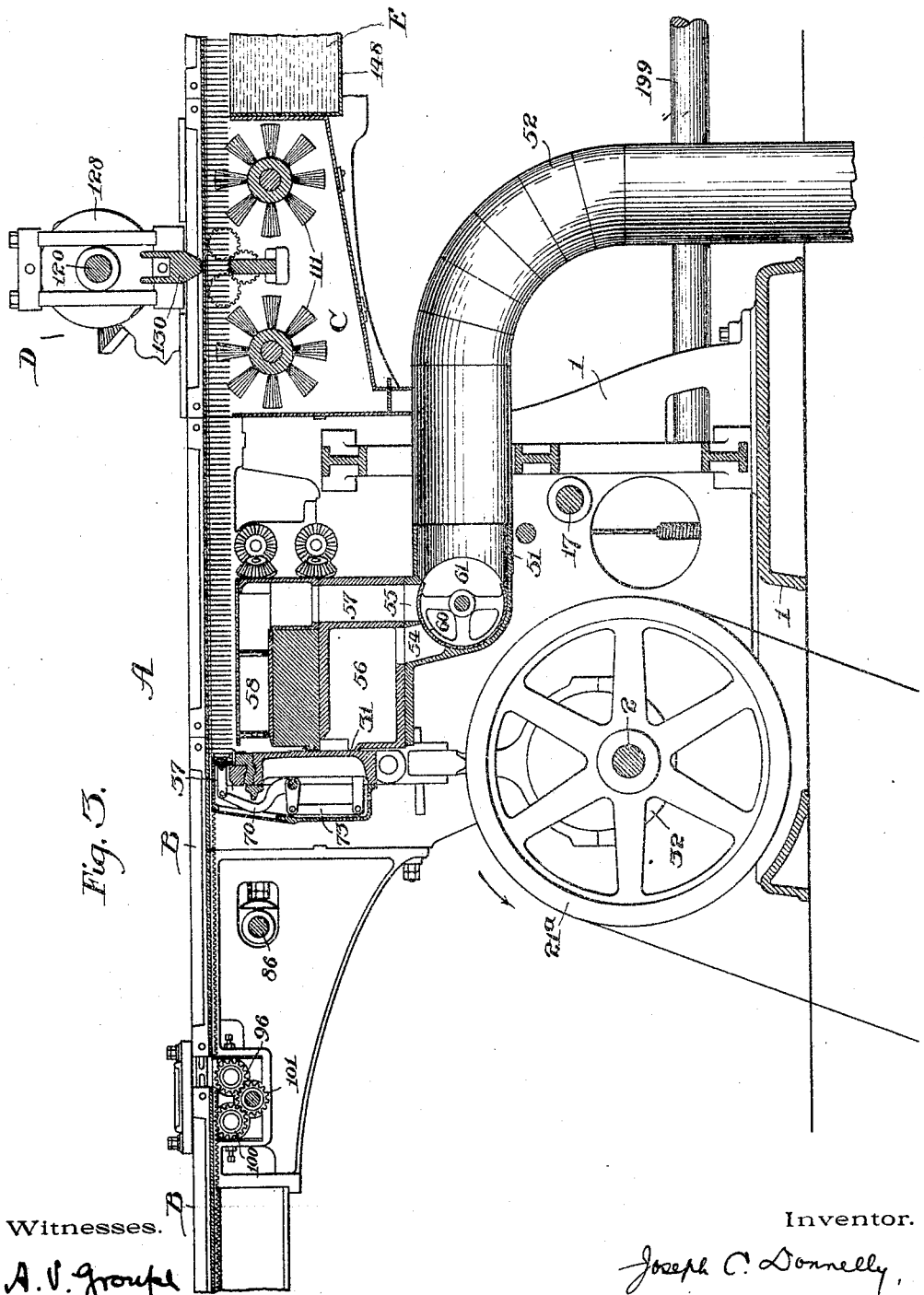
Witnesses.
A. V. Groupil
N. L. ———
Inventor.
Joseph C. Donnelly,
per John R. Nolan
Attorney.

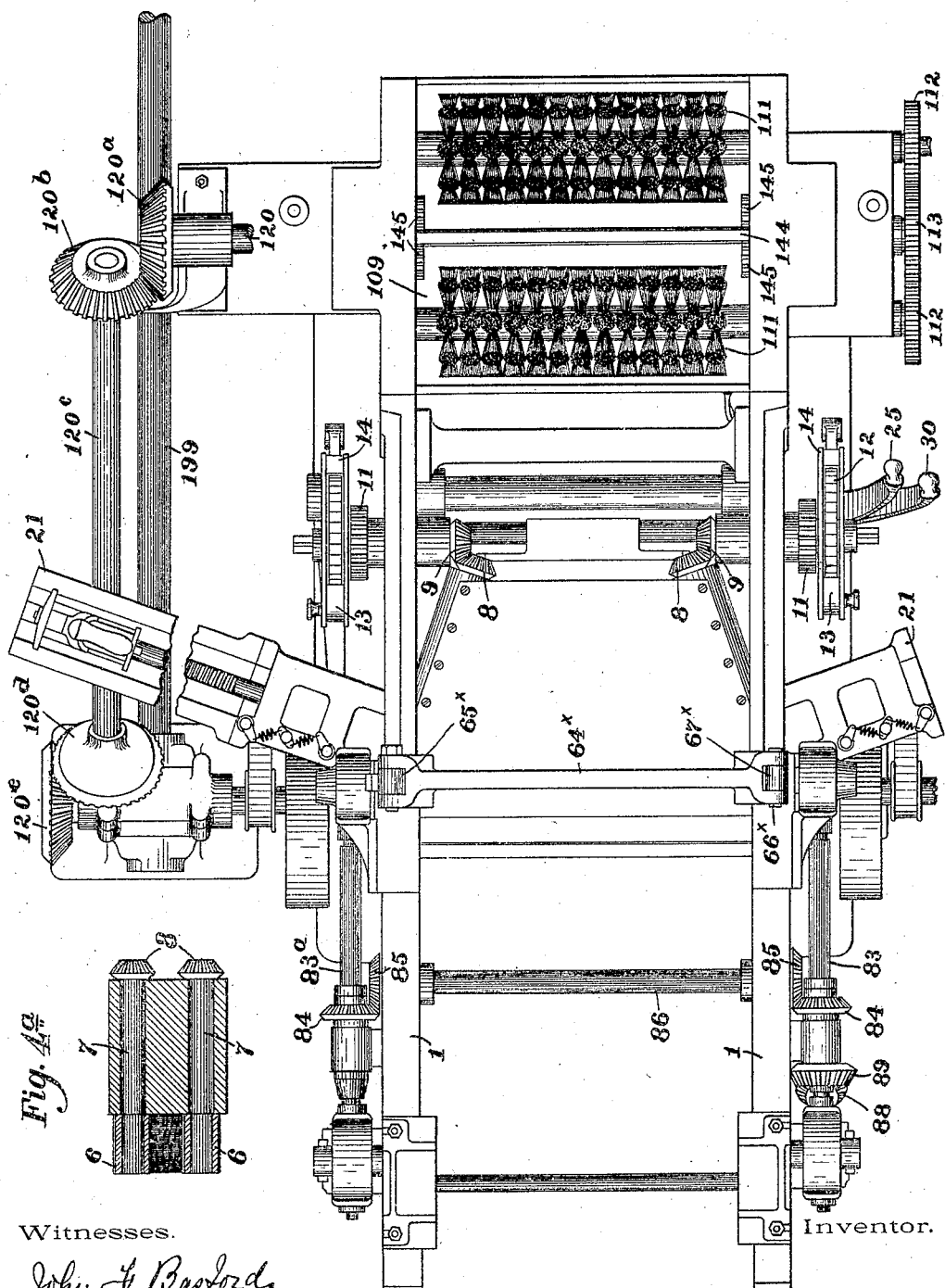

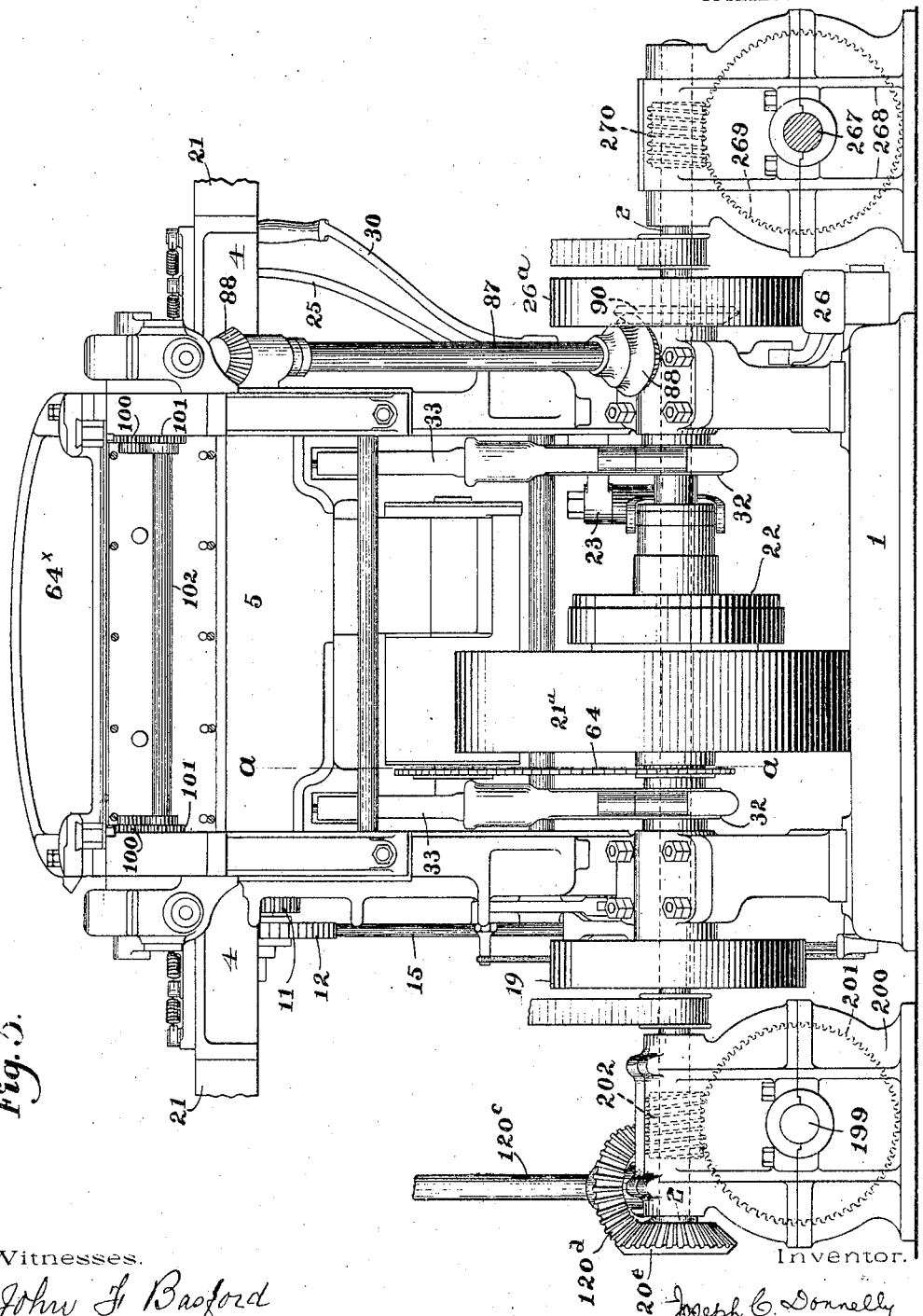

No. 778,953. PATENTED JAN. 3, 1905.
J. C. DONNELLY.
MATCH MAKING MACHINE.
APPLICATION FILED AUG. 26, 1897.

24 SHEETS—SHEET 9.

Witnesses. Inventor.
Joseph C. Donnelly
Attorney.

No. 778,953. PATENTED JAN. 3, 1905.
J. C. DONNELLY.
MATCH MAKING MACHINE.
APPLICATION FILED AUG. 26, 1897.
24 SHEETS—SHEET 10.
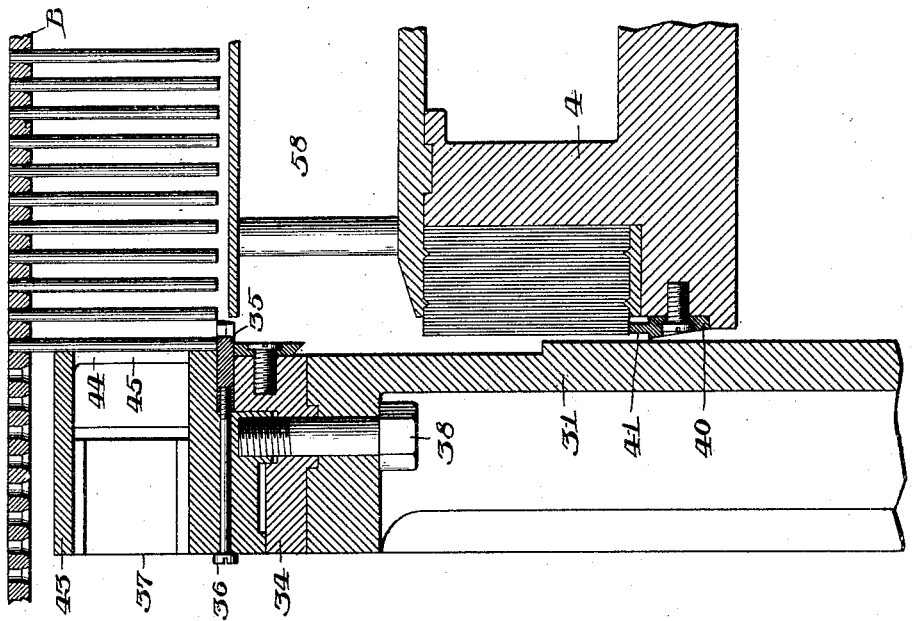
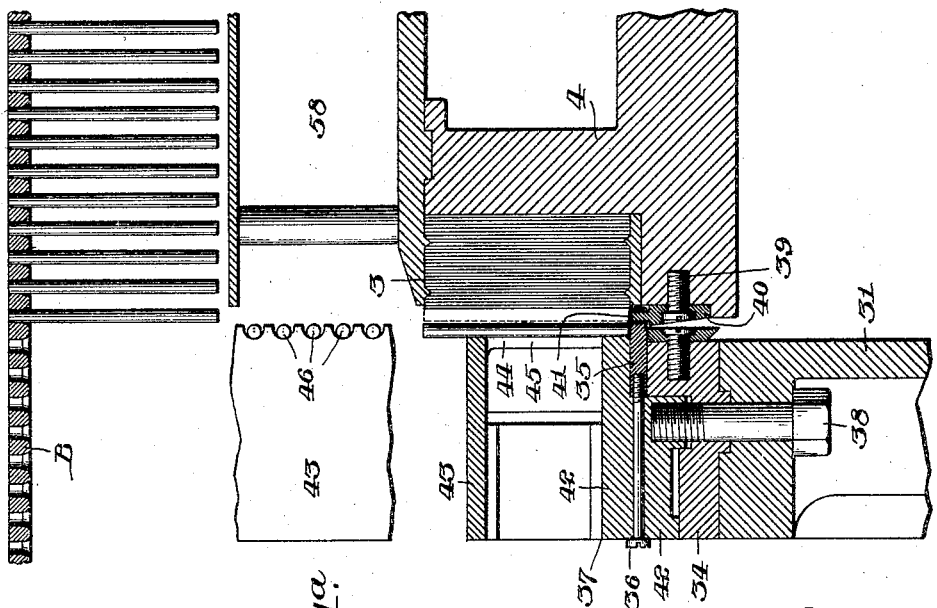
Witnesses.
Inventor.
Joseph C. Donnelly
per John B. Nolan
Attorney.

No. 778,953. PATENTED JAN. 3, 1905.
J. C. DONNELLY.
MATCH MAKING MACHINE.
APPLICATION FILED AUG. 26, 1897.
24 SHEETS—SHEET 11.
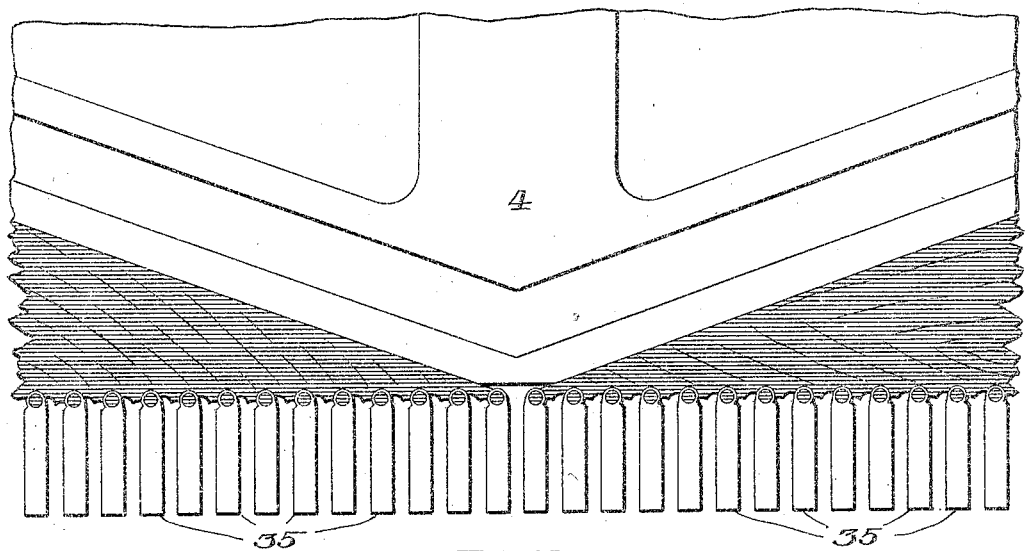
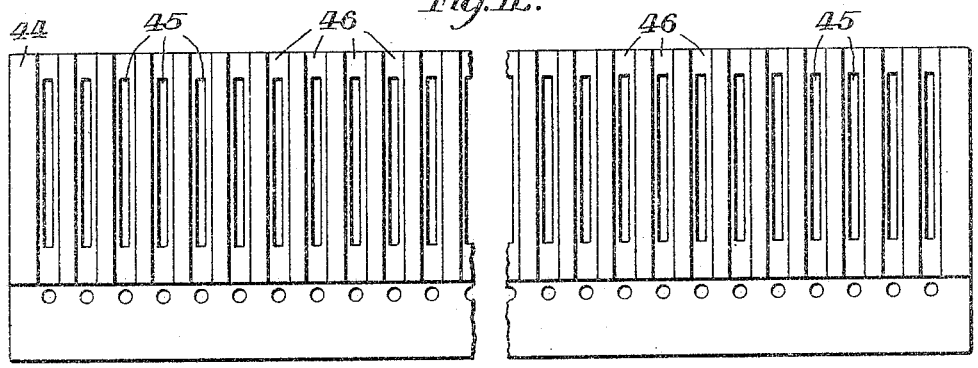
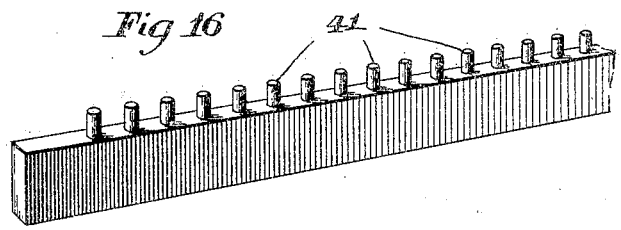
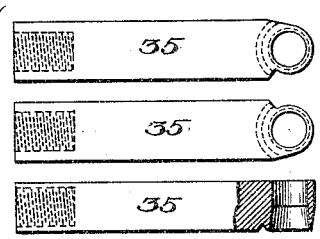
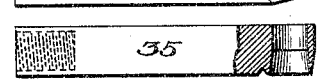
Witnesses.
Inventor.
Joseph C. Donnelly
per John R. Nolan
Attorney.

No. 778,953. PATENTED JAN. 3, 1905.
J. C. DONNELLY.
MATCH MAKING MACHINE.
APPLICATION FILED AUG. 26, 1897.
24 SHEETS—SHEET 12.
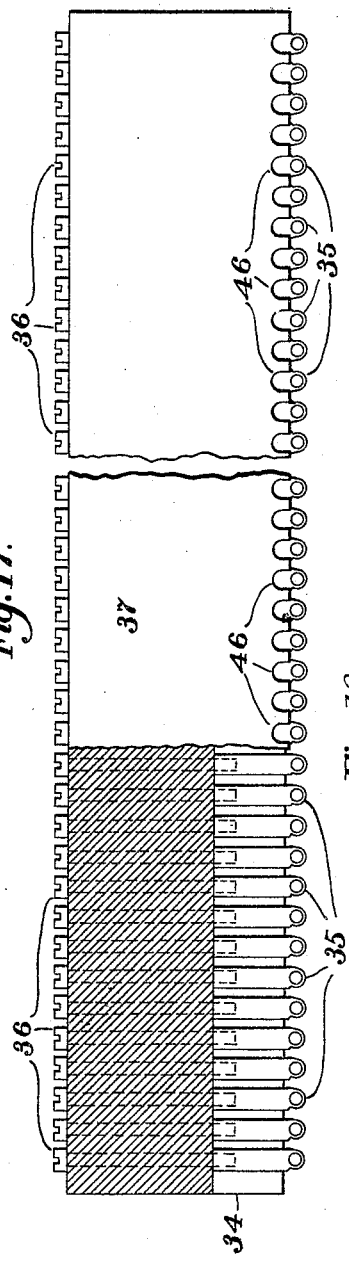
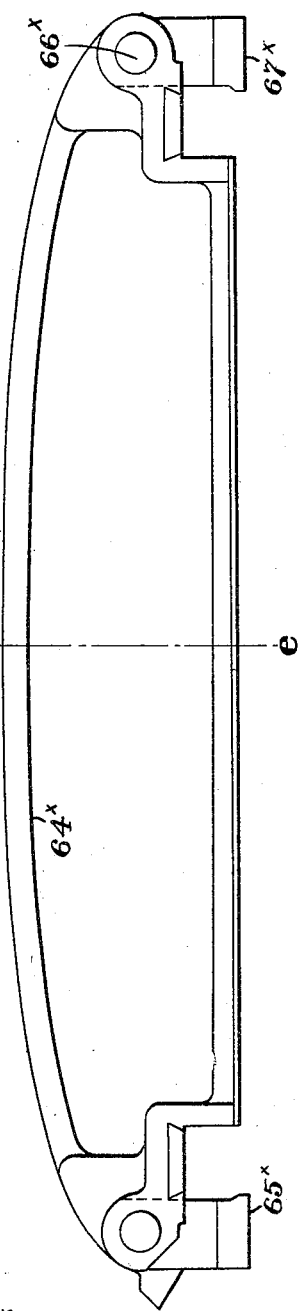
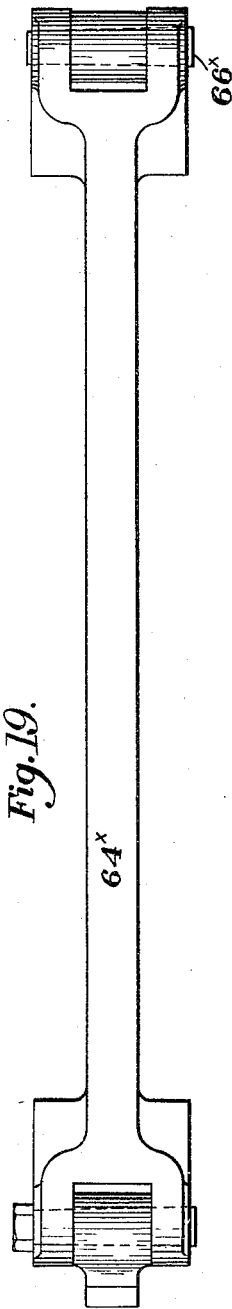
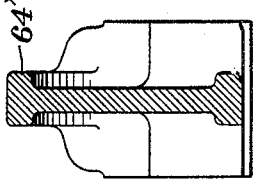
Witnesses.
John F. Basford
Jesse B. Heller
Inventor.
Joseph C. Donnelly,
per John R. Nolan
Attorney.

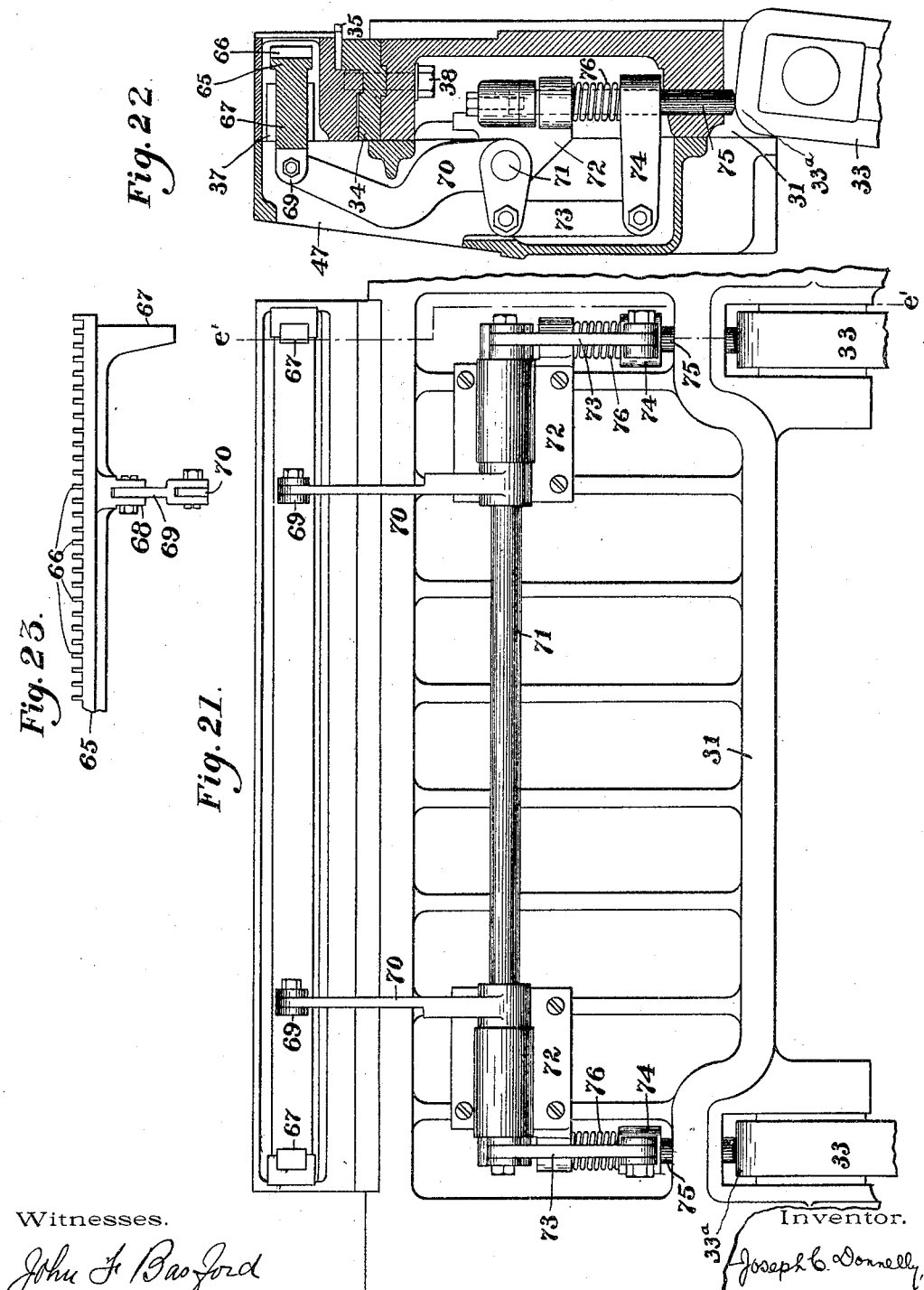

No. 778,953. PATENTED JAN. 3, 1905.
J. C. DONNELLY.
MATCH MAKING MACHINE.
APPLICATION FILED AUG. 26, 1897.

24 SHEETS—SHEET 14.

Witnesses.
A. V. Groupe
H. L. Cheeseman

Inventor.
Joseph C. Donnelly
per John R. Nolan
Attorney.

No. 778,953. PATENTED JAN. 3, 1905.
J. C. DONNELLY.
MATCH MAKING MACHINE.
APPLICATION FILED AUG. 26, 1897.
24 SHEETS—SHEET 15.
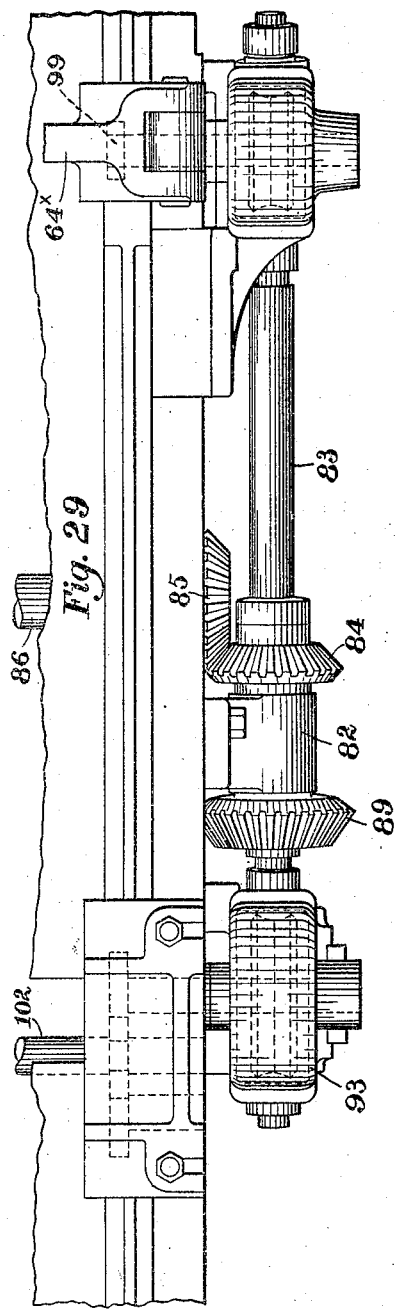
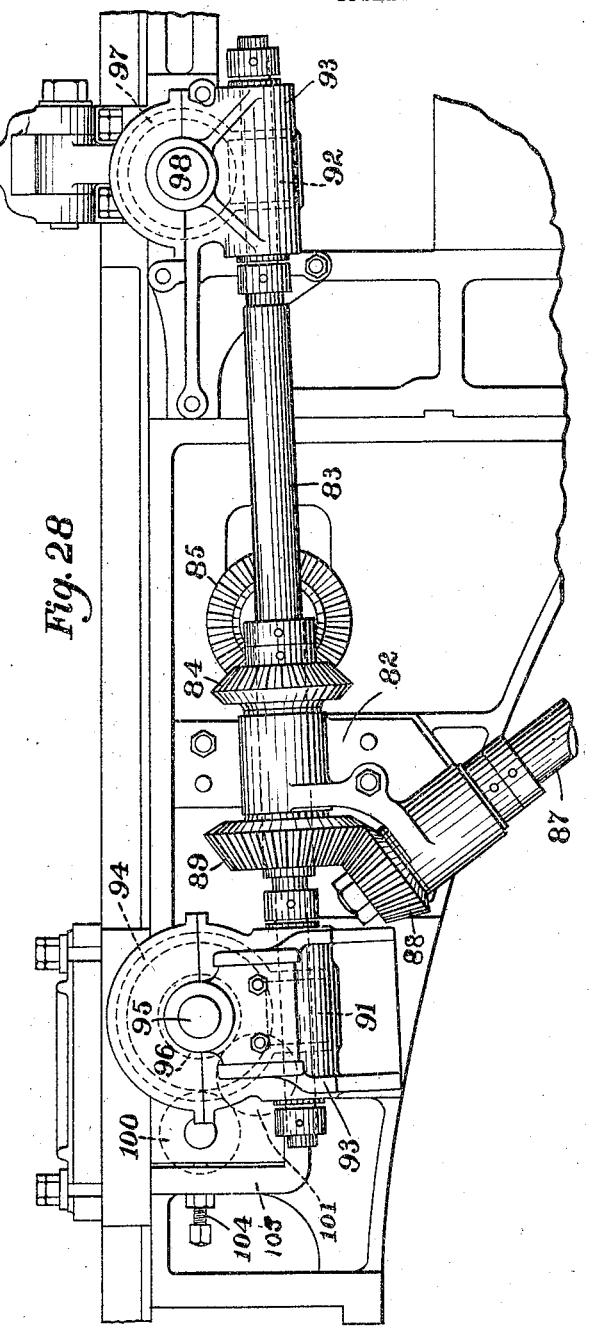
Witnesses.
John H. Basford
Jesse B. Heller
Inventor.
Joseph C. Donnelly,
per John R. Nolan
Attorney.

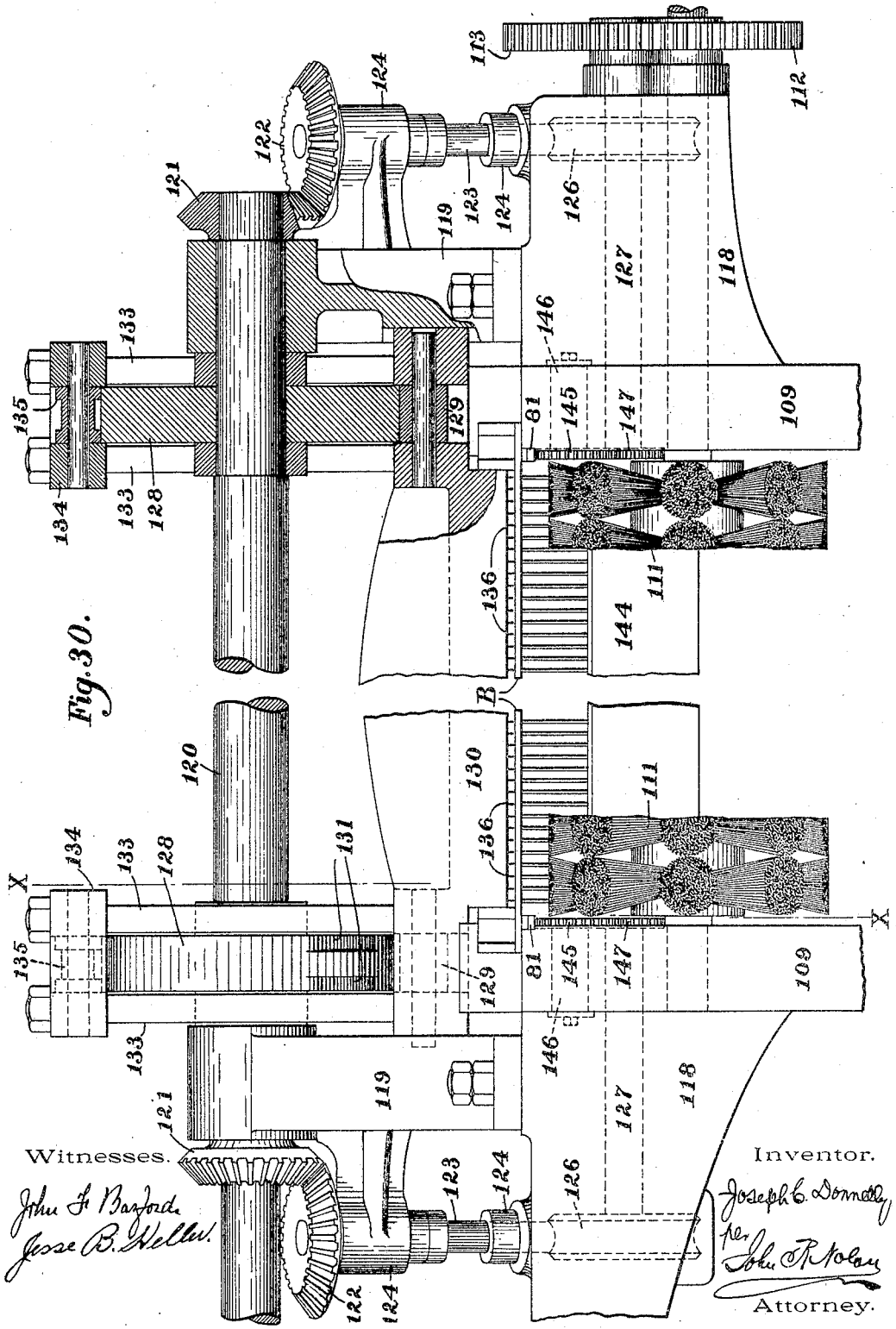

No. 778,953. PATENTED JAN. 3, 1905.
J. C. DONNELLY.
MATCH MAKING MACHINE.
APPLICATION FILED AUG. 26, 1897.
24 SHEETS—SHEET 17.
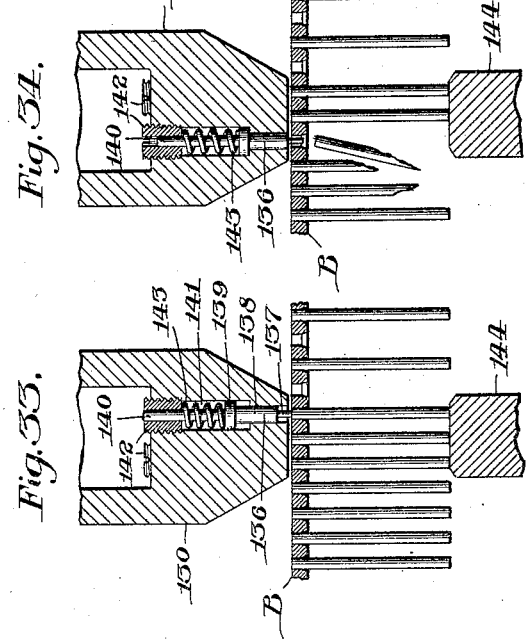
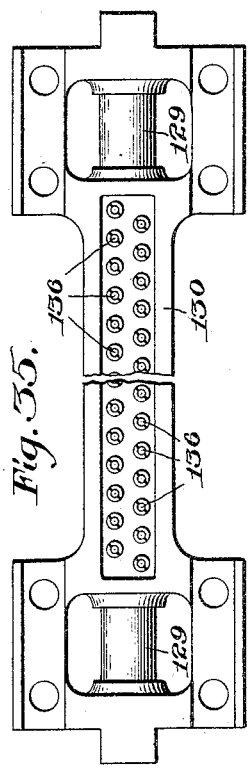
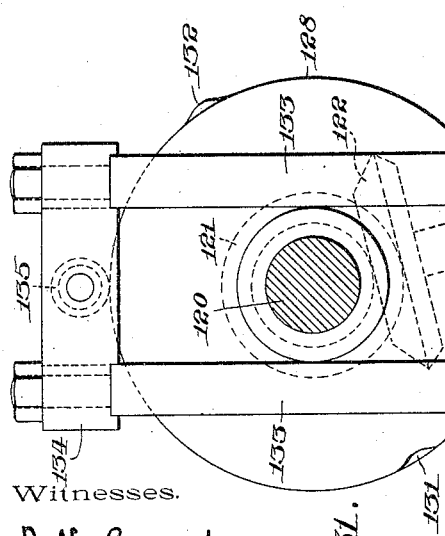
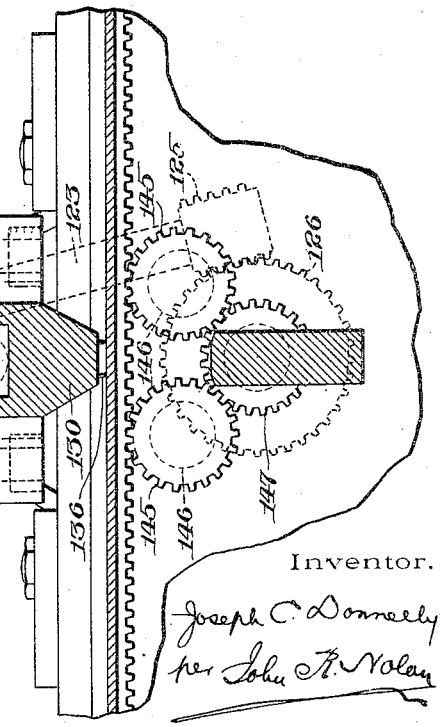
Witnesses.
Inventor.
Joseph C. Donnelly
per John R. Nolan
Attorney.

No. 778,953. PATENTED JAN. 3, 1905.
J. C. DONNELLY.
MATCH MAKING MACHINE.
APPLICATION FILED AUG. 26, 1897.

24 SHEETS—SHEET 18.

Witnesses.
Inventor.
Joseph C. Donnelly,
per John R. Nolan,
Attorney.

No. 778,953. PATENTED JAN. 3, 1905.
J. C. DONNELLY.
MATCH MAKING MACHINE.
APPLICATION FILED AUG. 26, 1897.
24 SHEETS—SHEET 19.
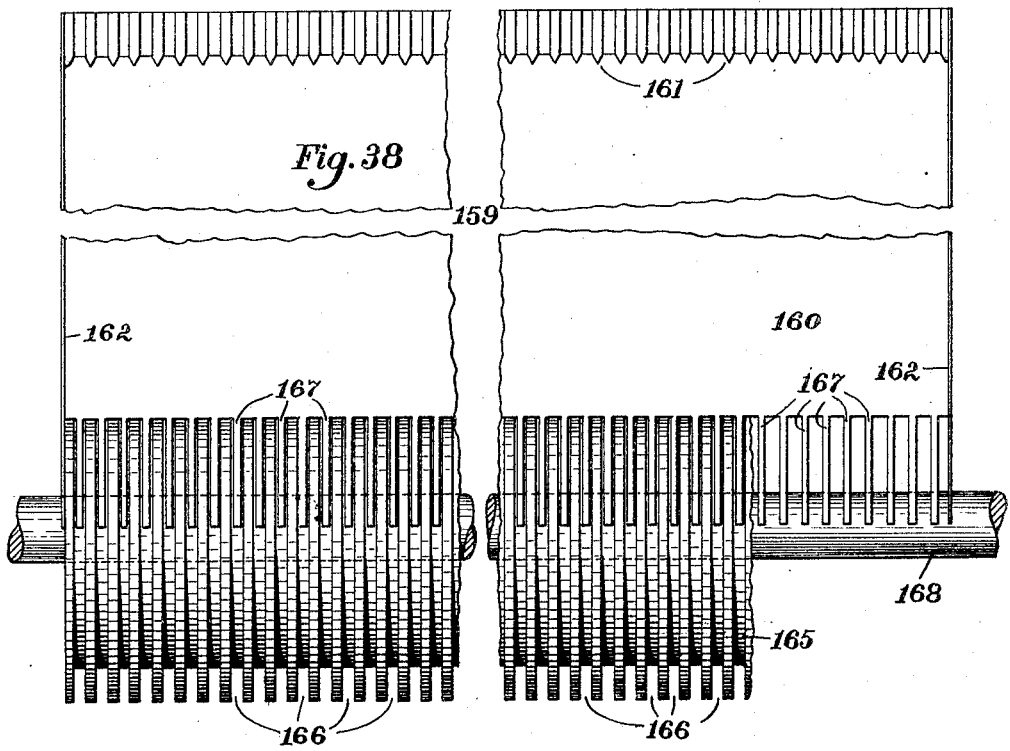
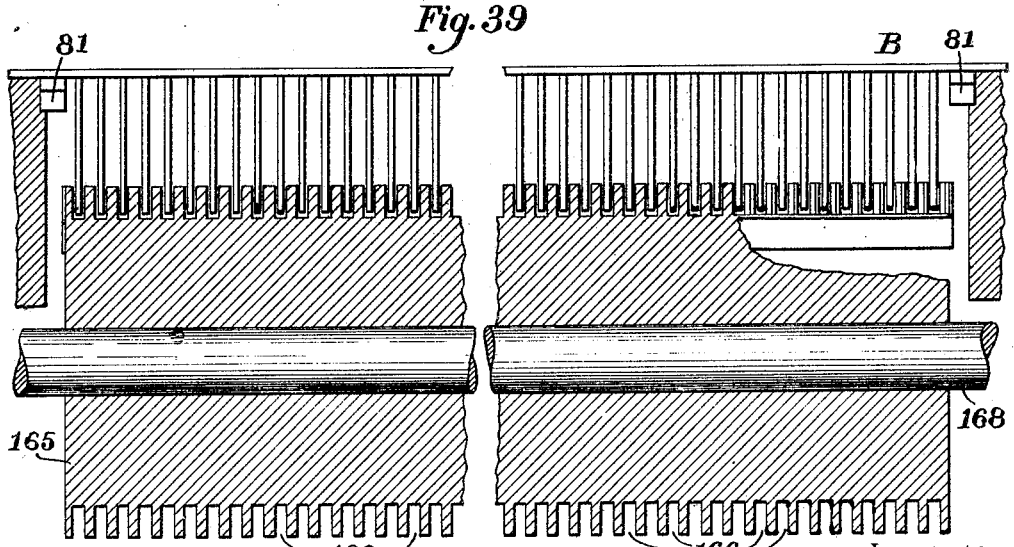
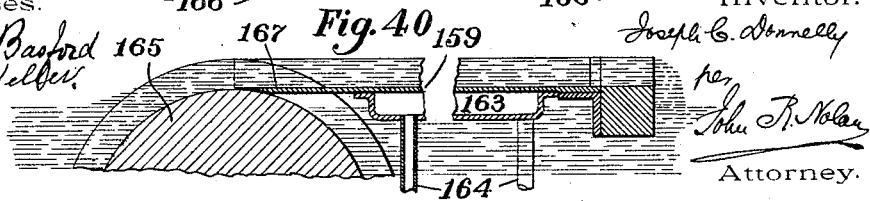

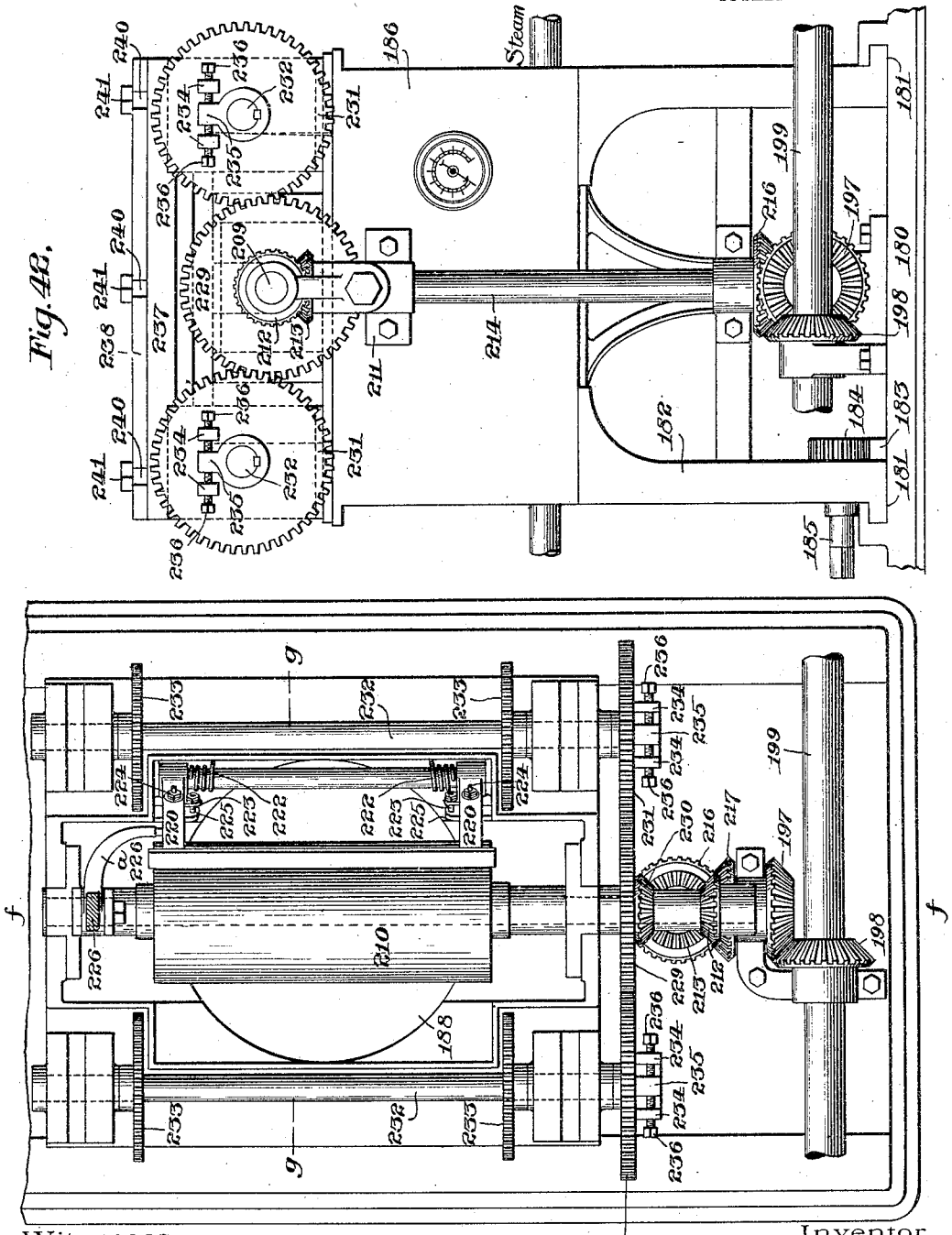

No. 778,953. PATENTED JAN. 3, 1905.
J. C. DONNELLY.
MATCH MAKING MACHINE.
APPLICATION FILED AUG. 26, 1897.
24 SHEETS—SHEET 21.

Witnesses. Inventor.
Joseph C. Donnelly
per John B. Nolan
Attorney.

No. 778,953. PATENTED JAN. 3, 1905.
J. C. DONNELLY.
MATCH MAKING MACHINE.
APPLICATION FILED AUG. 26, 1897.

24 SHEETS—SHEET 22.

Witnesses.
John F. Basford
Jesse B. Wells

Inventor.
Joseph C. Donnelly
per
John R. Nolan
Attorney.

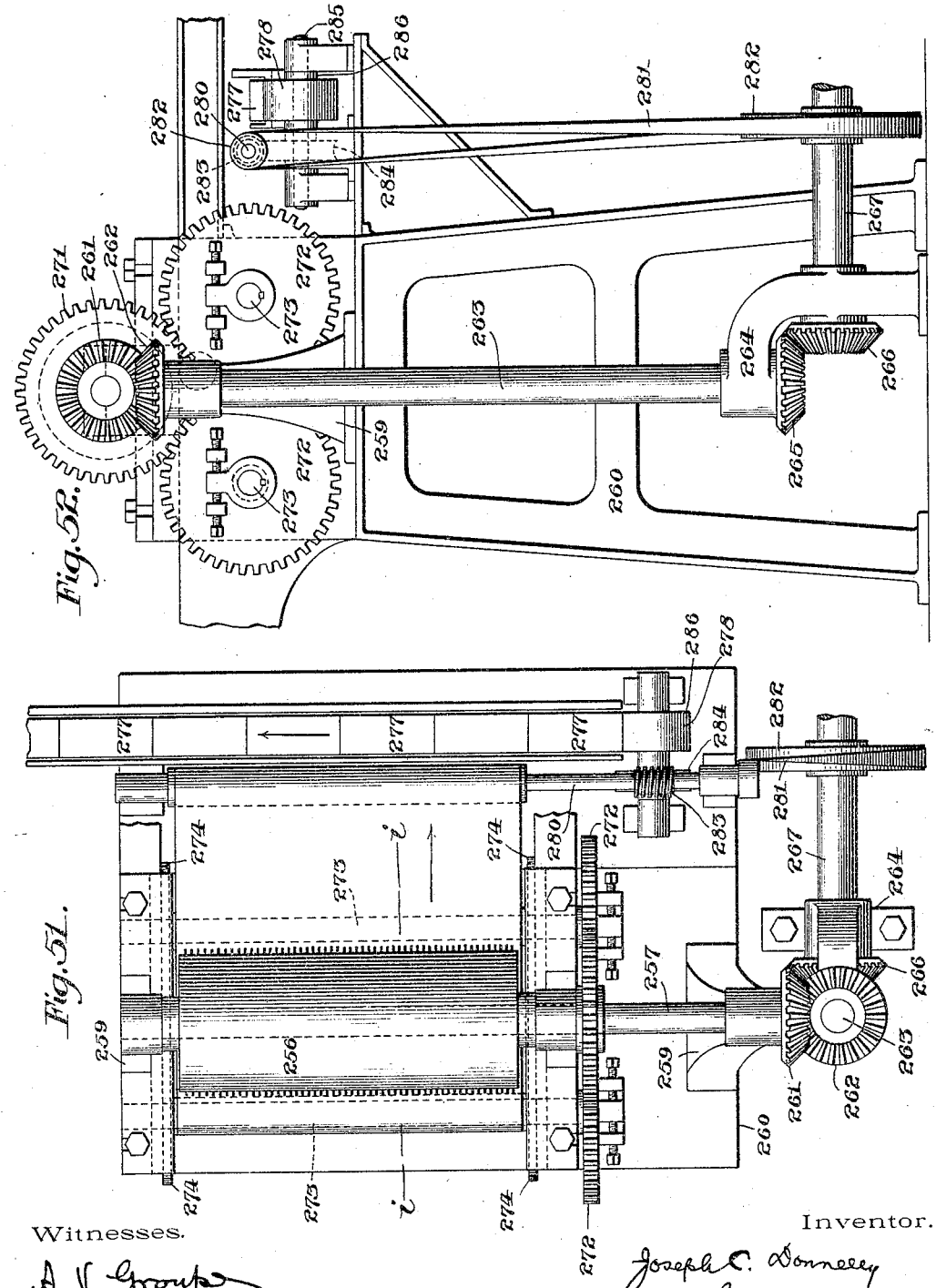

No. 778,953. PATENTED JAN. 3, 1905.
J. C. DONNELLY.
MATCH MAKING MACHINE.
APPLICATION FILED AUG. 26, 1897.

24 SHEETS—SHEET 24.

Witnesses.
John F. Basford
Jesse B. H. Ellis

Inventor.
Joseph C. Donnelly,
per John R. Nolan
Attorney.

No. 778,953. Patented January 3, 1905.

UNITED STATES PATENT OFFICE.

JOSEPH C. DONNELLY, OF PHILADELPHIA, PENNSYLVANIA, ASSIGNOR TO THE DIAMOND MATCH COMPANY, OF NEW YORK, N. Y., A CORPORATION OF ILLINOIS.

MATCH-MAKING MACHINE.

SPECIFICATION forming part of Letters Patent No. 778,953, dated January 3, 1905.

Application filed August 26, 1897. Serial No. 649,572.

*To all whom it may concern:*

Be it known that I, JOSEPH C. DONNELLY, a citizen of the United States, residing in the city and county of Philadelphia and State of Pennsylvania, have invented certain new and useful Improvements in Match-Making Machines, of which the following is a full, clear, and exact description, reference being had to the accompanying drawings, forming a part of this specification.

This invention relates to machines for making matches, and, as generally stated, comprehends an entirely automatic construction and organization of mechanism whereby splints are uniformly and expeditiously cut from stock, assembled row by row in a carrier from which broken or imperfect splints are ejected, and by which the remaining or perfect splints are transported to and through a paraffin-bath, thence to composition-applying devices, thence to and through a drying structure, the completed matches being uniformly ejected row by row from the carrier and conducted therefrom to a boxing apparatus or other suitable point of discharge.

The means whereby are attained the several results or operations above stated embody in many respects broadly new features, some of which may be applied to or used in connection with mechanism wherein the splints, whether of wood, wax-taper, or other substance, are delivered from a hopper or similar feeding device, while other features may be independently used to perform their separate functions in the manufacture of matches generally.

As the construction and operation of a machine involving my invention are hereinafter described at length and the novel features particularly pointed out in the claims, no preliminary description thereof is deemed necessary. In considering that part of the machine which I have termed the "splint cutting and inserting mechanism," reference may be had to my Letters Patent of the United States No. 565,674, dated August 11, 1896.

Figure 7:
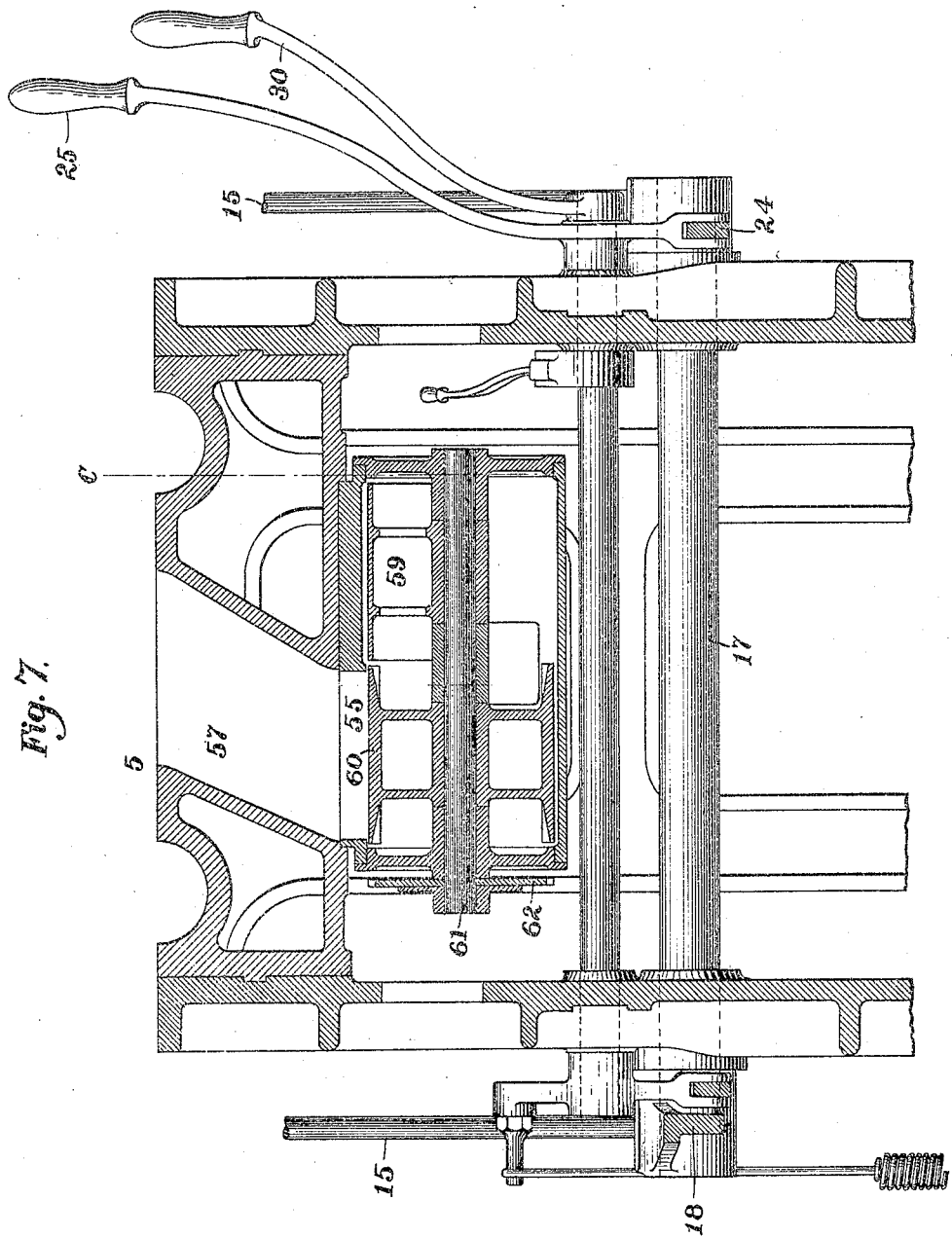
Figure 8:
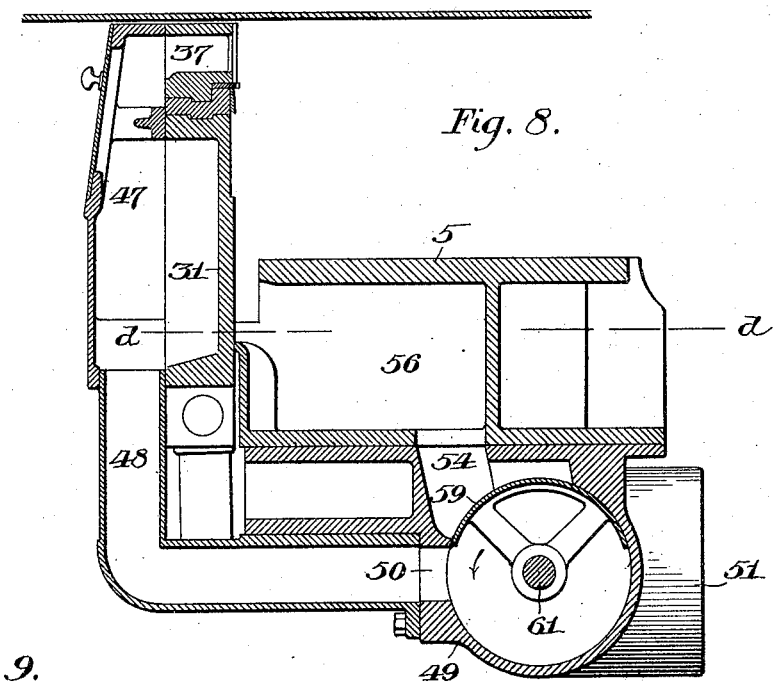
Figure 9:
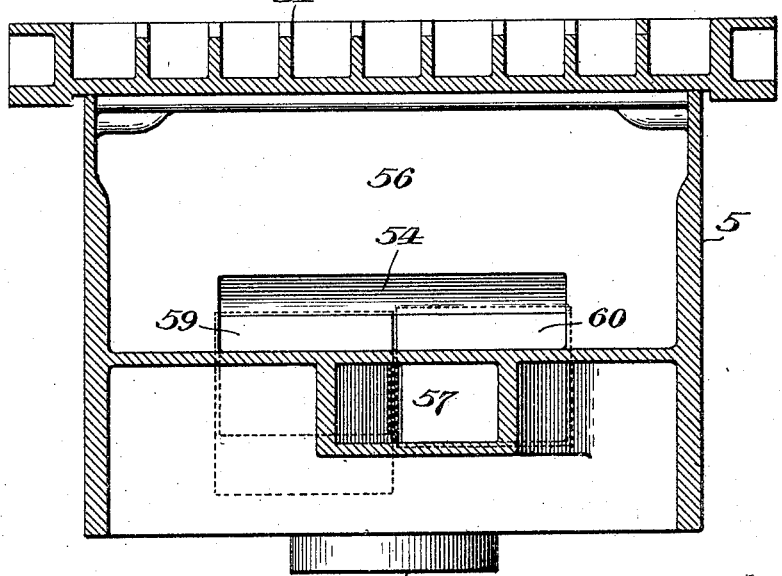
Figure 24:
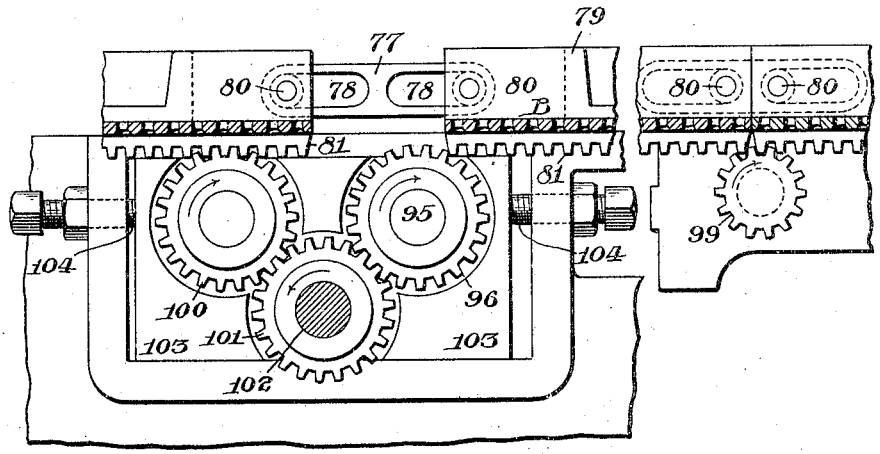
Figure 25:
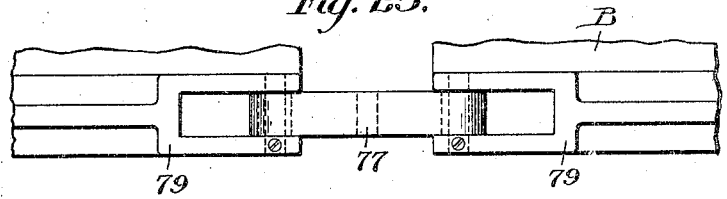
Figure 26:
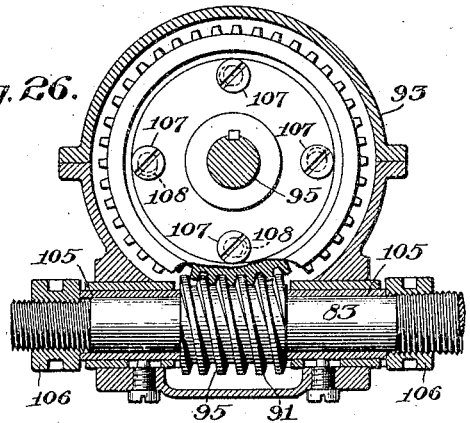
Figure 27:
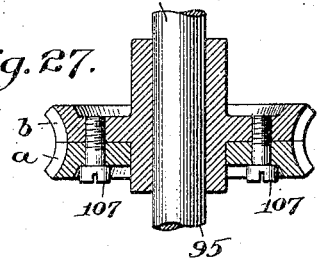
Figure 36:
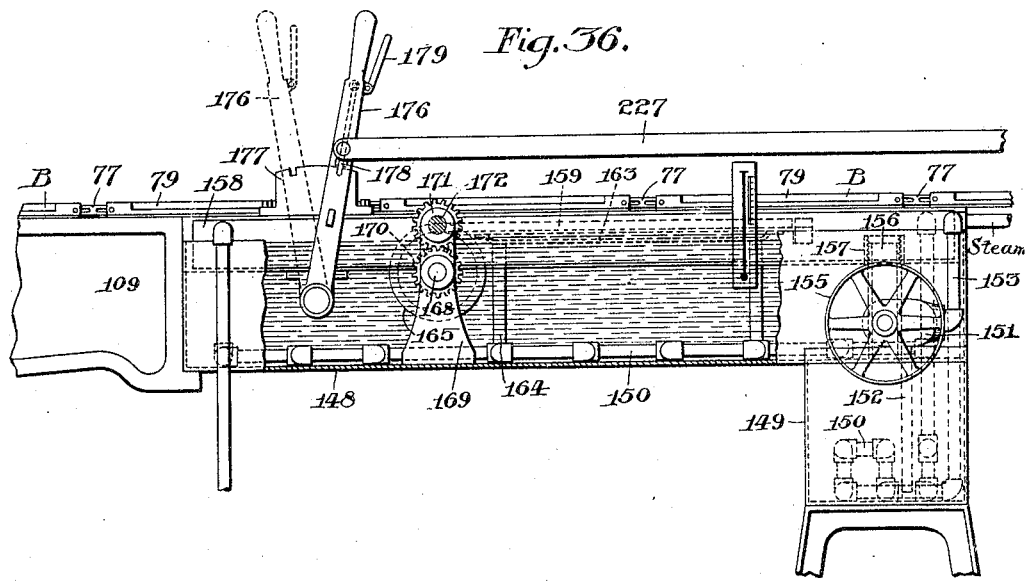
Figure 37:
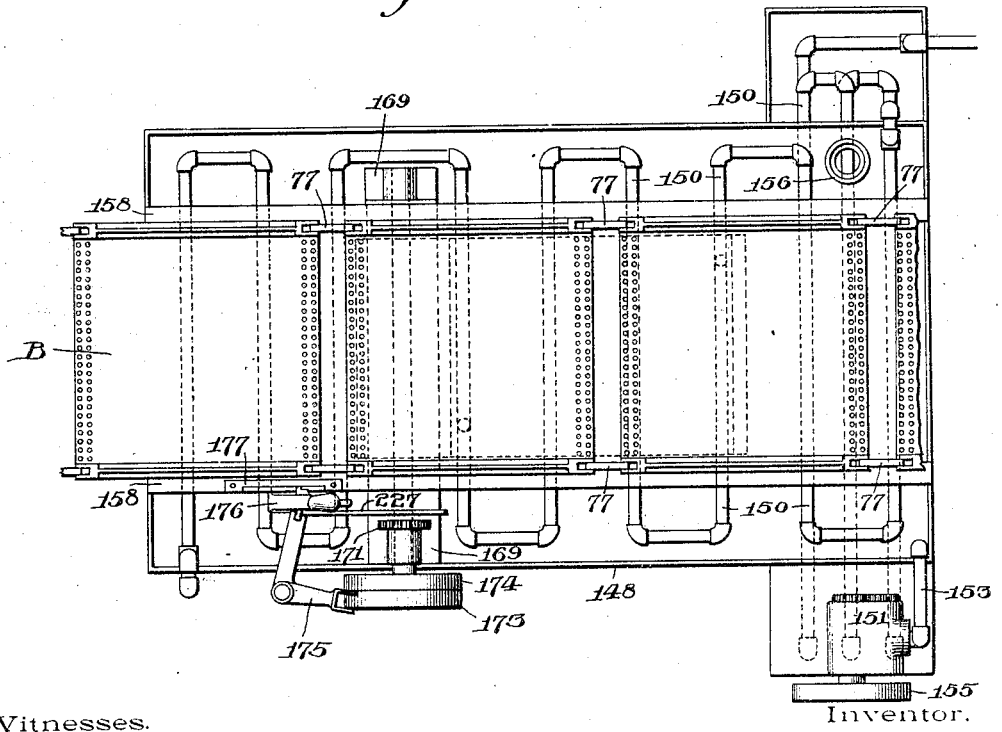
Figure 43:
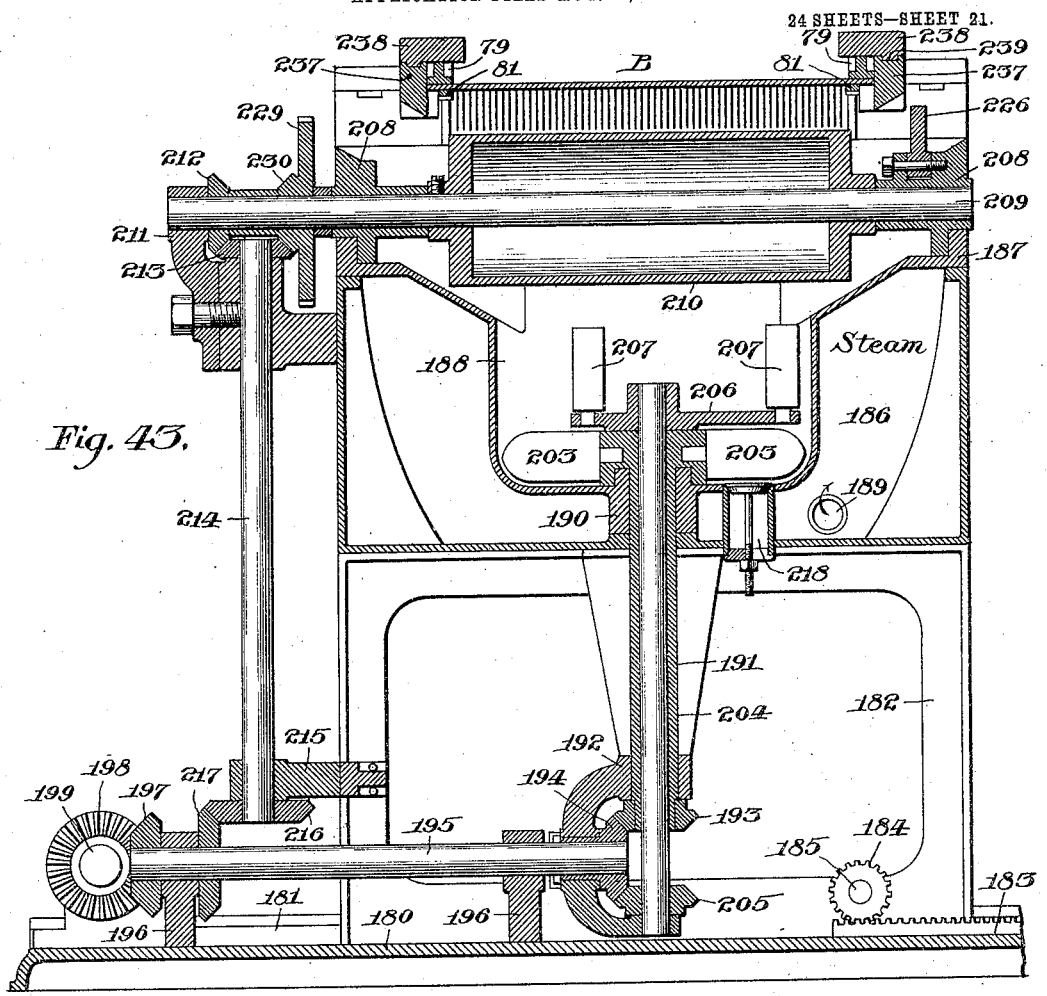
Figure 44:
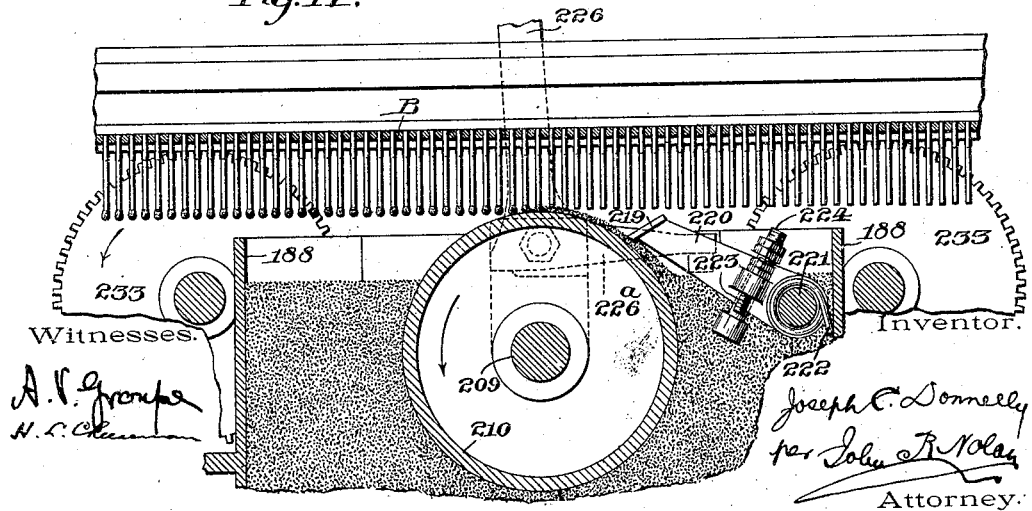
Figure 45:
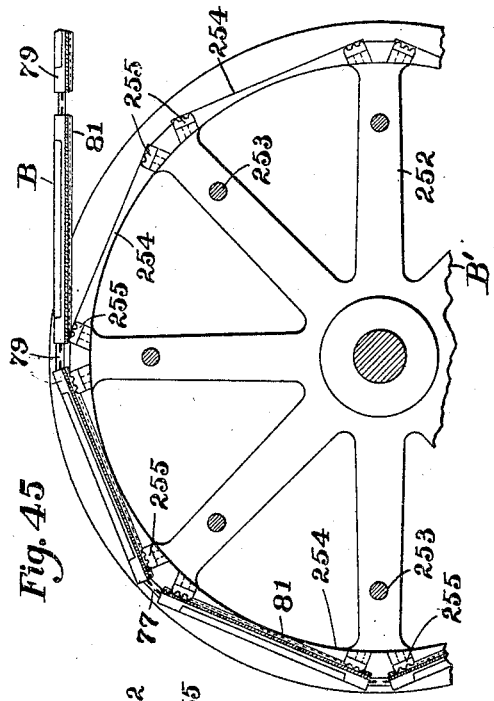
Figure 46:
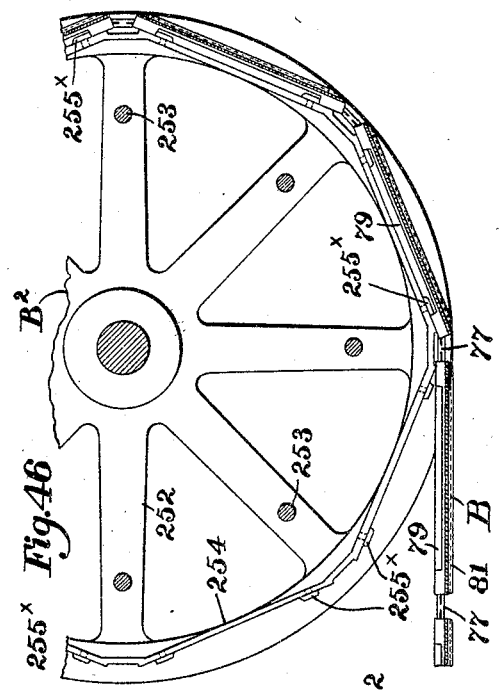
Figure 47:
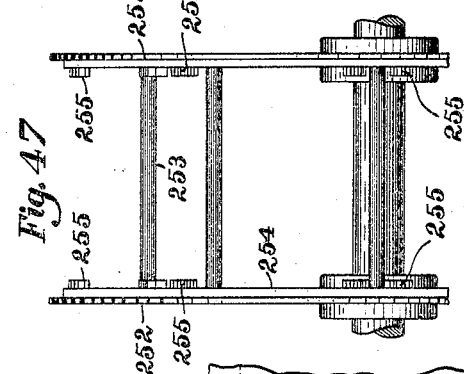
Figure 48:
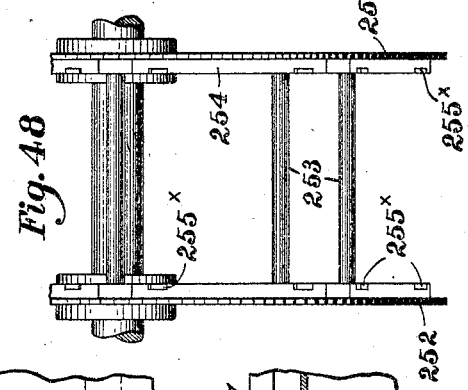
Figure 49:
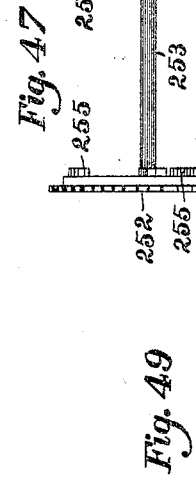
Figure 50:
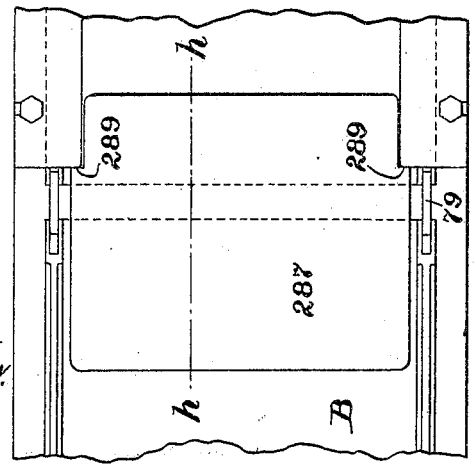
Figure 53:
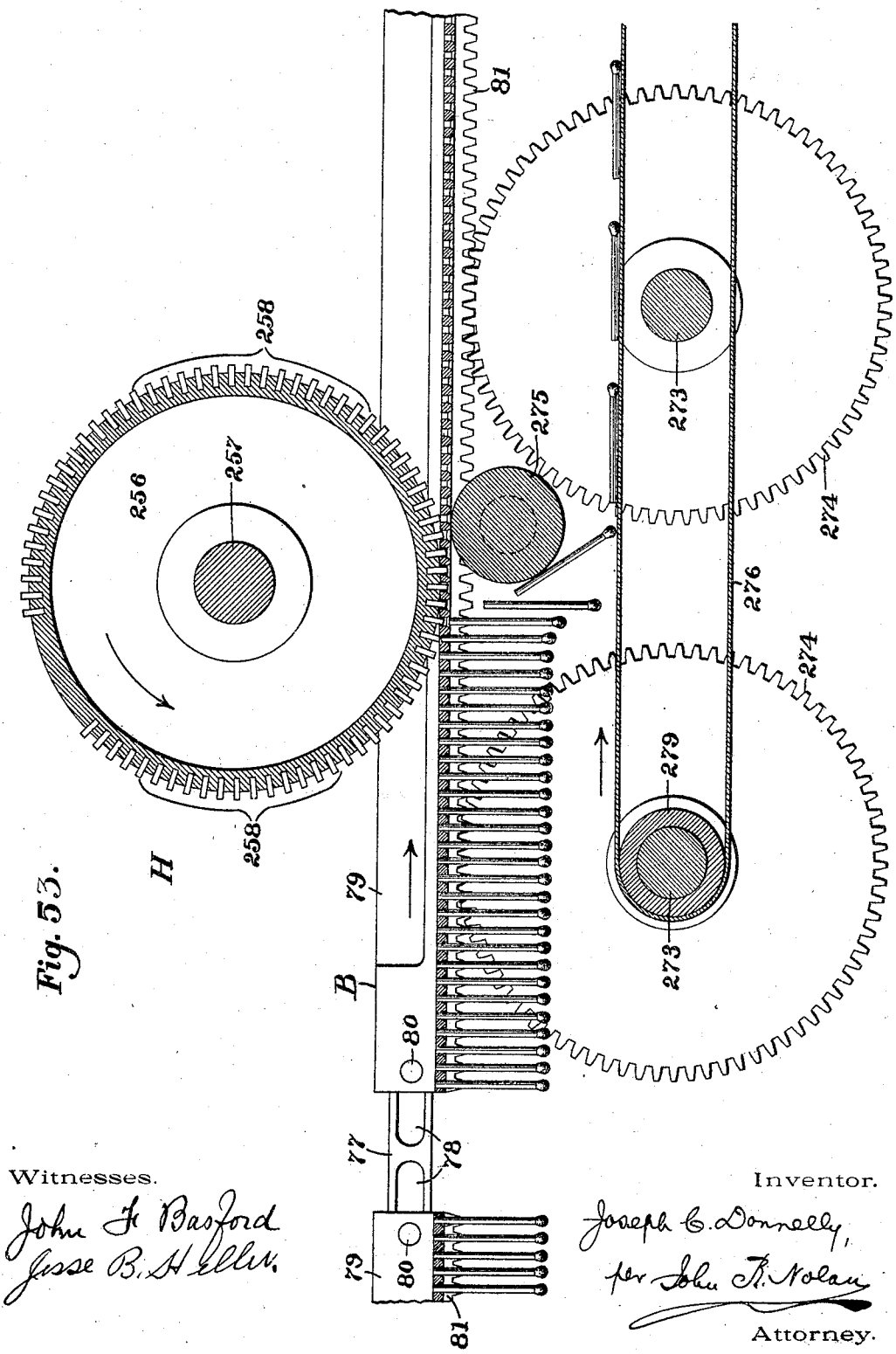

In the annexed drawings, Figure 1 is a side elevation of the entire apparatus, excepting the drying structure, which is shown in vertical section in Fig. 1$^a$. Fig. 2 is a side elevation of the splint cutting and inserting mechanism, the clearing and cleaning devices, and the waste-chamber. Fig. 3 is a longitudinal vertical section through Fig. 2. Fig. 4 is a plan of Fig. 2, parts of the punching mechanism being omitted. Fig. 4$^a$ is a section of the feed-rolls. Fig. 5 is a partial end view of Fig. 2 looking at the left-hand end thereof. Fig. 6 is a vertical section as on the line $a\,a$ of Fig. 5. Fig. 7 is a transverse vertical section as on the line $b$ of Fig. 2. Fig. 8 is a vertical section as on the line $c$ of Fig. 7. Fig. 9 is a transverse section as on line $d\,d$ of Fig. 8. Fig. 10 is a section of the cutter-head, transfer device, and carrier, showing the head in down position preparatory to introducing splints to the carrier. Fig. 11 is a similar view showing the cutter-head up and the splints inserted in the carrier. Fig. 11$^a$ is a detail plan of the pocketed transfer device with splints therein. Fig. 12 is a front view of said transfer device as detached. Fig. 13 is a plan of a pair of cutters. Fig. 14 is a sectional elevation of one of the cutters. Fig. 15 is a plan of a portion of the duplex hopper with wood therein, showing the row of cutters as in operation. Fig. 16 is a perspective view of a studded bar which coacts with the cutters to free the splints therefrom. Fig. 17 is a sectional plan of the transfer device and the cutter-head with its cutters. Fig. 18 is an elevation of the counter-thrust bar. Fig. 19 is a plan thereof. Fig. 20 is a transverse section as on the line $e\,e$ of Fig. 18. Fig. 21 is an elevation of the cutter-head with back casing removed to show the mechanism for expelling imperfect splints, slivers, &c., from the slots and pockets in the transfer device. Fig. 22 is a vertical section as on the line $e'\,e'$ of Fig. 21. Fig. 23 is a detail of the toothed ejecting-bar and adjuncts. Fig. 24 is a detail of the carrier-sections and the gearing for actuating the same in respect to the splint-inserting mechanism. Fig. 25 is a plan of coupling devices for adjoining carrier-sections. Fig. 26 is an elevation, enlarged, of one of the worms and worm-wheels of said gearing. Fig. 27 is a transverse section of the worm-wheel. Fig. 28 is a side elevation of said gearing. Fig. 29 is a plan of same. Fig. 30 is a sectional elevation of the punch-head and its operating mechanism, showing a portion of the underlying brush and waste-chamber. Fig. 31 is a section as on the line $x\ x$ of Fig. 30. Fig. 32 is a section of one of the cams for reciprocating the punch-head. Fig. 33 is a sectional elevation, enlarged, through the punch-head, the underlying carrier-plate, and the splint-sustaining bar, showing a punch as in engagement with a supported splint and retracted. Fig. 34 is a similar view showing the action of the punch on a broken or unsupported splint. Fig. 35 is a view of the under side of the punch-bar, showing the rows of staggered punches therein. Fig. 36 is a sectional elevation of the paraffin trough, pan, tank, and adjuncts. Fig. 37 is a plan of Fig. 36. Fig. 38 is a plan of the pan and the feed-roller therefor. Fig. 39 is a section through the roller directly in advance of the pan, showing the overlying carrier and splints therein. Fig. 40 is a section through the pan and the adjacent part of the feed-roller, indicating the operation of the roller in feeding the paraffin to and upon the pan. Fig. 41 is a plan of the composition-box, the composition-applying roller, and the driving-gearing therefor. Fig. 42 is a side elevation of said composition structure, showing the gearing therefor and for the carrier. Fig. 43 is a vertical section as on the line $f\ f$ of Fig. 41. Fig. 44 is a section as on the line $g\ g$ of Fig. 41. Figs. 45 and 46 are sections of the guiding and supporting wheels for the carrier. Figs. 47 and 48 are end views thereof, respectively. Fig. 49 is a plan of drag hereinafter referred to. Fig. 50 is a section as on the line $h\ h$ of Fig. 49. Fig. 51 is a plan of mechanism for ejecting splints from the carrier and transferring them to the trays. Fig. 52 is a side elevation showing the driving mechanism. Fig. 53 is a section as on the line $i\ i$ of Fig. 51, showing the carrier and the coacting studded roller.

A represents a mechanism for cutting the splints from the block and thrusting them row by row into a continuously-driven endless carrier B, which in its course is directed and guided by suitably-arranged wheels B' B².

C is a brush mechanism arranged in rear of the mechanism A in a manner to clean the splints as they are moved onward by the carrier.

D is a punching mechanism adapted to eject broken or defective splints from the carrier.

E is a paraffin-applying mechanism arranged in the path of and adapted to treat the splints during their traverse.

F is a composition-applying mechanism arranged in rear of the mechanism D in a manner to "head" the splints.

G is an elongated drying-chamber, through which the splints thus headed are carried.

H is a discharging mechanism arranged adjacent to the splint-cutting mechanism in a manner to eject the matches row by row from the carrier and direct them to a boxing apparatus of any appropriate character preparatory to the succeeding traverse of the carrier.

The several mechanisms referred to will be hereinafter considered in detail in the order above named.

Respecting the splint cutting and inserting mechanism, 1 designates a substantial frame, in which the main driving-shaft 2 is mounted. On this frame is a duplex hopper 3, embodying in its construction two converging chambers, by way of which the blocks of wood are fed to the cutters. This hopper comprises a channeled base 4, bolted to the top of an underlying chambered casting 5, fixed between the sides of the main frame correspondingly with the hopper set out in my previous patent above mentioned. Within the respective chambers of the hopper near the discharging portion thereof are the milled feed-rollers 6, by means of which the wood is periodically fed forward. As in my previous construction, the rollers are formed on shafts 7, that extend inwardly at right angles to the hopper, or substantially so, and are mounted in boxes on the top of the casting 5. The mechanism herein illustrated for actuating these shafts is substantially similar to that of my previous construction, differing therefrom in mere matters of detail—that is to say, the shafts are provided on their extremities with bevel-wheels 8, respectively, which coact with similar wheels 9 on horizontal stud-shafts 10. These latter shafts carry on their outer ends coacting gears 11, respectively. On the end of each of the lower stud-shafts 10 is a ratchet-wheel 12, with which engages an actuating-pawl 13 on a rock-lever 14, that is loosely mounted on the shaft, whereby when said lever is oscillated the ratchet-wheel and its connections are intermittently rotated. The lever is connected by means of a link 15 with a crank-arm 16 on a transverse rock-shaft 17, which has its bearings in the sides of the main frame. Affixed to this shaft is an arm 18, which bears upon and is actuated by an appropriate cam 19 on the main shaft, said arm being held in action with the cam by means of a suitably-disposed spring 20.

Extending outwardly from each chamber of the hopper is an auxiliary hopper 21, which is constructed to receive the wood and feed it into the bite of the feed-rolls. This auxiliary hopper and its appurtenances being fully set out in my previous patent requires no particular description herein.

As in my previous construction, the driving-pulley 21ª is loosely mounted on the main shaft, and an appropriate clutch 22, arranged adjacent thereto, is connected through a bell-crank 23 and link 24 with a suitable hand-lever 25, whereby the pulley may be made fast or loose on the shaft, as desired. Below a wheel 26ª on the main shaft is a brake-shoe 26, which bears against the periphery of the wheel when the pulley is unclutched, the shoe being mounted on a cam-lever 27, that is actuated through a spring-controlled lever 28 when the hand-lever is operated. The mechanism just alluded to need not be further considered herein, as the same is particularly described in my previous patent. The shaft 29, on which the hand-lever is loosely fulcrumed, has affixed thereto a lever 30, whereby the shaft may be independently operated to control certain tension devices for the feed mechanism in the auxiliary hopper. The tension devices and the feed mechanism are also fully set out in said patent.

31 designates a vertically-reciprocable head or carrier which is fitted to and guided in appropriate ways in the frame and is actuated from the shaft 2 by means of eccentrics 32, with which it is connected by rods 33. On this head is bolted or otherwise secured a cutter-bar 34, on the upper side of which is formed a series of parallel ways extending transversely of the bar. In these ways are fitted the shanks of forwardly-projecting tubular cutters 35, which shanks at their rear ends are tapped for the reception of screws 36, that are applied to horizontal perforations in a chambered structure 37, (hereinafter described), which is arranged upon the cutter-bar and clamped thereto by vertical screw-bolts 38 or the like. It will be seen that by manipulating the screws 36 the cutters may be independently adjusted to insure their alinement; also, that the cutters may be separately removed and replaced as occasion may require. When the cutters are properly adjusted, their working ends are in the same vertical plane as the projecting ends of the blocks in the hopper, so that in the descent of the reciprocating head the cutters will pass down into the wood and sever match-splints therefrom, substantially similar to the cutters in my previous construction.

On the lower forward edge of the duplex hopper is secured by screws 39 or other means a bar 40, on the upper edge of which are formed a series of vertical studs 41, that are equal in number to the tubular cutters and are directly in the path thereof, to the end that the cutters as they complete their downward stroke will surround the respective studs, and the latter acting against the opposing ends of the row of splints will perforce permit the cutters to clear the same. The row of splints thus severed from the block are moved back from the path of the cutters, so that in the upward stroke of the head the splints are raised thereby and thrust into the overlying carrier. In the present construction the splints are drawn laterally by suction upon or adjacent to the shanks of the cutters, which shanks in the upward stroke of the head act as thrust-bars against the lower ends of the splints, as hereinafter described.

The chambered structure 37 above referred to extends from end to end of the cutter-bar. It comprises a bottom or base plate 42, a top plate 43, and a front plate 44, the last-named plate being provided with a series of parallel vertical slots 45, that are equal in number to and lie directly rearward of the cutters. These slots preferably open into vertical parallel pockets or grooves 46 in the outer face of the plate to the end that when air is exhausted from the chamber, as below stated, the splints cut from the blocks as above described will be drawn laterally into said pockets or grooves preparatory to the upward stroke of the cutter-head. The rear of the chamber opens directly into a hollow casing 47, that is bolted on the back of the cutter-head, so as to reciprocate therewith and with the chamber. Extending into the lower end of this casing is the vertical limb of an adjacent pipe 48, the horizontal limb of which is bolted to a transversely-arranged cylindrical valve-casing 49, so as to communicate with a port 50 therein. This valve-casing is bolted to the under side of the chambered casting 5, above referred to, and is connected by means of a lateral extension 51 with a vertical pipe 52, leading to a suitably-arranged fan 53 or other air-exhausting apparatus, whereby if the port 50 be alternately opened and closed the air will be periodically exhausted from the chamber 37 for the purpose stated. The valve-casing is also provided with two additional ports 54 and 55, the former of which communicates with a transverse chamber 56 in the casting 5, while the latter port opens into a vertical passage 57 in said casting and communicates thereby with a horizontal chamber 58, disposed above the duplex hopper, to the end that air may be exhausted from these chambers.

The port 54 is closed while the sticks are being punched into the carrier, as shown in Fig. 3, but during the descent of the cutters and a portion of the ascent thereof the port 54 is open, and hence the splints, slivers, &c., resulting from the cutting operation are drawn from the chamber 56 by and to the fan and discharged therefrom. The ports 50, 54, and 55 are opened and closed at predetermined intervals through the instrumentality of two suitably-located segmental valves 59 and 60, which are affixed to a central shaft 61 in the valve-casing. This shaft has its bearings in the end heads of the casing, one end of the shaft extending outwardly and being equipped with a sprocket-wheel 62, that is geared with a similar wheel 63 on the main shaft by means of a sprocket-chain 64, whereby the shaft and its valves are continuously rotated. The valves are so set in respect to each other and to the ports that when the cutter-head is at the limit of its downstroke the port 50 is open, so as to exhaust from the chamber 37 while the port 55 is closed. Hence the splints cut from the blocks, as above stated, are drawn into the vertical pockets in the transfer device and retained therein in parallelism. Immediately upon the upward movement of the head the valve 60 continues to close the port 55, and the valve 59 permits the port 50 to remain open until the head reaches the extreme limit of its upward stroke, or nearly so. As the head begins to descend the valve 59 proceeds to close the port 50 and maintains it closed until near the completion of the stroke, when the port 55 is opened. Port 55 is opened while the transfer device is passing the mouth of the chamber 58 to the end that any broken or imperfect splints, chips, &c., that may be in or be ejected from the pockets or slots may be drawn into said chamber and be discharged therefrom by way of the fan.

As a simple and efficient means whereby broken or imperfect splints or foreign matter may be ejected from the slots and pockets I arrange within the chamber 37 a horizontally-movable bar 65, provided on its face with a series of studs or teeth 66, that are equal in number to and lie directly opposite the slots, whereby when the bar is moved forward its studs or teeth will register with the slots and pockets. This bar is provided with end pieces 67, that are fitted to guideways in the ends of the chamber, and it is also provided near its respective ends with rearwardly-projecting lugs 68, to which are connected, by means of links 69, the vertical arms of bell-crank levers 70. These levers are fulcrumed on a shaft 71, which is supported at its ends in brackets 72 on the reciprocable head. The shorter ends of the levers are connected, by means of links 73, with vertically-reciprocating arms 74. These arms are affixed to vertical rods 75, that are fitted to and guided at their ends in vertical openings in the cutter-head and in lugs on the brackets 72, respectively, springs 76 being interposed between the bracket and the arms, so as to maintain the latter normally depressed, and thereby through the link-and-lever connections maintain the bar normally retracted. The rods 75 are arranged slightly beyond the vertical centers of the respective connecting-rods 33 and extend adjacent to but not in contact with the upper ends of the latter when the connecting-rods are in vertical position. Hence during the successive oscillations of the connecting-rods the shoulders $33^a$ thereof abut against the rods 75 and elevate them against the pressure of the springs 76 in a manner to project the studded bar with the effect stated. It will be understood that when the cutter-head is at the extreme limit of each stroke the connecting-rods are vertical and their upper ends out of contact with the overlying rods 75, the bar 65 in consequence being in its normal or retracted position. While the cutter-head in its descent is passing the chamber 58, the angularity of the connecting-rods is such that their corners or shoulders $33^a$ impinge against the opposed rods 75 and effect thereby the operation of the bar 65 to eject the splints. In the ascent of the cutter-head the shoulders are moved out of contact with the rods 75, and in consequence said rods and their connections assume their normal positions in readiness for a succeeding operation.

The frame 1 is surmounted by a cross-bar $64^\times$, which lies directly above the carrier in position to counteract the thrust of the splint-inserting mechanism as it forces the splints into the carrier. One end of the bar is pivoted to a lug $65^\times$ on one side of the frame, while the other end of the bar is detachably secured, by means of a pin $66^\times$, to a lug $67^\times$ on the other side of the frame. Hence by removing this pin the bar may be swung upward to permit the carrier or its plates to be raised.

Referring next to the endless carrier and its actuating mechanism, B represents a series of perforated plates flexibly connected at their adjoining ends, preferably by means of laterally-disposed links 77. These links, which are longitudinally slotted, as at 78, are extended into the slotted or bifurcated ends of bars or ribs 79 on the upper sides of the respective plates and are supported and guided therein by means of studs 80, which extend through the sides of said bars and through the said intermediate slots in the links, whereby said plates may be independently moved toward and from each other within limits for a purpose hereinafter described. The perforations in the respective plates are formed in equidistant parallel rows, the end rows thereof being so arranged in respect to the ends of the plates that when two adjoining plates are brought end to end, or substantially so, the distance between the adjacent rows is equal to that between the adjacent rows in the body of the plate, and in consequence uniform interspaces between the rows of perforations in the adjoining plates are secured. (See Fig. 24.) The plates are thus moved together preparatory to their passage above the splint-inserting mechanism, to the end that the end rows of perforations in said plates will be brought successively into line with the uniformly-reciprocating splint-inserting mechanism, similarly to the succeeding rows in the body of the plates. These plates are subsequently separated, so as to permit their being flexed upon and around the supporting and guiding wheels B' B² and especially to obviate any liability of the matches in the end rows of the adjoining plates crossing and coming into contact with each other as such plates are passing around those wheels on which the matches inwardly project. The particular time when the plates are brought together preparatory to their passage above the splint-inserting mechanism and the particular time when the plates are separated after they leave such mechanism and before they pass to the supporting and guiding wheels are immaterial. In the present instance the plates are brought into end-to-end contact just before their entrance to the splint-inserting mechanism A and are retained in contact until their passage from the punching mechanism D, whereupon they are separated.

Instead of perforated plates the carrier may be made up of any appropriate sections having provisions for receiving and holding splints or blanks.

On the under side of each of the plates near its respective lateral edges are longitudinal racks 81, the end teeth whereof are so disposed that when two adjoining plates are brought together, as above stated, the continuity of the rack is preserved. Meshing with these racks are appropriate gear-wheels, by means of which the carrier is continuously and unremittingly driven, and the plates thereof during its traverse are independently moved into and out of contact with and from each other at predetermined intervals. In the present instance the gearing illustrated for actuating the plates is of the following construction: In appropriate bearings 82 on the respective sides of the frame are mounted two parallel shafts 83 83$^a$, which are provided with correspondingly-located bevel-wheels 84, with which coact similar wheels 85 on the respective ends of a transverse shaft 86, whereby when the shaft 83 is rotated the opposite shaft is likewise driven. Shaft 83 is driven from the main driving-shaft through the medium of a diagonal shaft 87, which is provided on its respective ends with bevel-gears 88, that coact with similar wheels 89 and 90 on the shaft 83 and main driving-shaft 2, respectively. On the respective ends of each of the shafts 83 83$^a$ are worms 91 92, which are incased by the boxes 93, in which the ends of the shafts are mounted. The worm 91 on the left end of each of said shafts coacts with a worm-wheel 94 on a stud-shaft 95 in one of said boxes, which stud-shaft carries a pinion 96, that meshes with the teeth of the adjacent rack on the plates of the overlying carrier in a manner to impel said plates toward the splint-cutting mechanism. The worm 92 on the right-hand end of each of the shafts coacts with a worm-wheel 97 on a stud-shaft 98 in the adjacent box, which stud-shaft carries a pinion 99, that in turn coacts with the racks on the carrier-plates. The forward gears 99 are relatively smaller than the rearward gears, and in consequence each successive plate engaged by the latter gears is advanced against the opposing end of the preceding plate, and such plates are perforce impelled in end-to-end contact toward and over the splint-inserting mechanism for the purpose above stated. The gears are of course so located relatively to each other that as the rearward end of a plate is disengaged from the gears 96 the forward end thereof is engaged by the gears 99. In rear of the gears 96 are arranged corresponding gears 100, that engage the rack-bars of the plates in succession and advance them to the former gears. The gears 100 are appropriately driven from the gears 96 by means of idlers 101 on a shaft 102. The shafts of gears 96 100 are supported in bearings in slide-blocks 103, which may be adjusted as desired in respect to the carrier by means of set-screws 104 working in housings 105, in which the blocks are fitted.

I preferably so mount the respective worms 91 92 on their shafts that the worms may be nicely adjusted lengthwise to insure accurate register thereof with the teeth of the coacting worm-wheels, and thus attain perfectly uniform actuation of the carrier. With this end in view each of the worms is loosely mounted on its shaft between sleeves 105$^a$, which are clamped against the respective ends of the worm by screw-nuts 106 on the shaft. It will be obvious that by manipulating these nuts the sleeves, and therewith the worm, may be minutely adjusted lengthwise of the shaft and secured in the desired position of adjustment. I also preferably make each of the worm-wheels in two parts $a$ and $b$, the outer part $a$ being adjustable on the inner part $b$ and being held in place thereon by set-screws 107 passing through slots 108 in the former part. By this construction the outer part may be slightly turned to effect minute adjustment of the sectional teeth thereon in respect to those of the adjacent section for the purpose of compensating for wear of the teeth, and thus obviating all liability of "backlash."

By the use of a continuously-moving carrier increased speed and more uniform operation may be attained than by the intermittently-movable carrier commonly employed. This follows from the fact that the number of reciprocating parts is reduced and a continuous rotary movement is had instead of a jumping action. Besides, the operation of the carrier is positive, thus obviating the use of the locking devices required in the step-by-step construction.

On the end of the frame 1 is bolted a box 109, the open upper side of which lies immediately beneath the advancing carrier-plates, to the end that the splints as they are carried onward will pass through the box. In the sides of this box at a suitable distance apart are journaled two parallel shafts 110, carrying brushes 111, which shafts project through one side of the box and bear exterior gear-wheels 112, with which coacts an interposed idler 113. One of the shafts is provided with a pulley 114, which is belted with a pulley 115 on an overhead counter-shaft 116, whereby the brush-shafts are simultaneously driven reversely of the direction of movement of the carrier in a manner to engage the splints and brush the dust, waste, &c., therefrom as the splints are carried through the box. The air-exhaust pipe 52 is provided with a branch 117, which extends into the bottom of the box, so as to discharge the waste, &c., therefrom.

In order that broken or imperfect splints in the carrier may be expelled therefrom into the waste-box, I have provided the following construction: On the sides of the box are projections 118, to which are bolted pedestals 119, in which is journaled a transverse shaft 120. One end of the shaft is extended outward and is provided with a bevel-wheel $120^a$, which coacts with a similar wheel $120^b$ on the upper end of an inclined shaft $120^c$. On the lower end of the latter shaft is a bevel-wheel $120^d$, which coacts with a like wheel $120^e$ on the end of the main shaft, whereby the shaft 120 is continuously and positively driven. Fixed on the shaft 120 adjacent to the respective pedestals are bevel-wheels 121, which gear with corresponding wheels 122 on the upper ends of inclined shafts 123, respectively. These latter shafts have their bearings in suitably-disposed boxes 124 and carry on their lower ends worms 125, that coact with worm-wheels 126, respectively, the shafts 127 of which have their bearings in the opposite sides of the box. Hence motion is transmitted from the shaft 120 to the shafts 127. Shaft 120 near its respective ends carries cam-wheels 128, which act upon antifriction-rollers 129 in an underlying cross-head 130. These wheels each comprise a circular disk interrupted at diametrically opposite points by recesses 131 and a projection 132, respectively. The ends of the cross-head are fitted to and guided in vertical guideways in the inner sides of the pedestals. Rising from the ends of the cross-head are vertical posts 133, which are connected at their upper ends by cross-bars 134, so as to constitute open frames which embrace the respective cams. In the cross-bars are fitted rollers 135, against which roll the peripheries of the cams, such rollers being provided with circumferential grooves for the free passage of the projections on the cams. It will be seen that during the rotation of the shaft 120 the projections on the cams at a part of their revolution bear upon the rollers 129 and depress the cross-head, the recesses 131 in that case being directly below the rollers 135, so as to permit their descent, and that as the rotation of the cams continues the opposing walls of the recesses riding against the rollers 135 quickly raise the cross-head. Thus during each revolution of the shaft 120 the cross-head is reciprocated. On the under side of the cross-head is a gang of normally projected spring-controlled punches 136, which are so constructed and arranged as to register with the successive rows of perforations in the moving carrier during the reciprocations of the cross-head. In the present instance there are two parallel rows of punches staggered and adapted to engage alternate holes of two adjacent rows in the carrier, whereby during the traverse of the carrier the two rows of punches act successively upon each advancing row of splints. Each of these plungers or punches comprises an ejecting-pin 137, a stem 138, a shoulder 139, and a guide-pin 140, the whole being fitted to and guided in the cross-head. The shoulder and pin are contained in a recess or socket 141 in the cross-head, the pin extending freely into a centrally-perforated screw-plug 142 at the mouth of the recess. Encircling the pin is a spiral spring 143, which bears against the plug and the shoulder, so as to depress the stem and maintain the pin thereon normally projected below the cross-head. By adjusting the screw-plug the pressure of the spring may be nicely regulated. Such pressure is that if the match-splints are unsupported at their lower or free ends the punches upon striking the upper ends of the splints will force them from the carrier; but if, on the other hand, the lower ends of the splints be supported the punches instead of ejecting the splints will retreat into the cross-head against the compression of their springs. Although any appropriate means may be employed to counteract the thrust of the punches on the splints, I prefer to use a transverse cross-bar 144, which is affixed within the box intermediate the brushes and directly below the plunger. The upper face of this bar is on the same horizontal plane as the lower ends of the perfect splints in the carrier, so that such ends are supported by the bar under the conditions stated; but if the splints be too short or imperfect the lower extremities thereof being above the bar and unsupported thereby will be ejected from the carrier by the punches. (See Figs. 33 and 34.)

The carrier is impelled at points adjacent to the punching mechanism by means of gears 145, that engage the rack-bars of the plates in succession. These gears are mounted on stud-shafts 146 in the respective sides of the box and are engaged with and impelled by gears 147 on the respective worm-wheel shafts 127, above referred to.

Adjacent to the waste-box 109 is a longitudinally-arranged trough 148, in which liquid paraffin is contained, so that the splints will be carried from said box into and through the paraffin and be thereby saturated. One end of this trough is secured to the end of the box, while the opposite end of the trough rests upon an underlying transversely-arranged tank 149, in which the parffin in solid form is melted. In the bottom of the trough and tank is arranged a coil of pipes 150, through which steam is circulated, whereby the paraffin in the tank is melted and that in the trough is maintained in liquid state. The melted paraffin in the tank is pumped therefrom into the trough by means of a pump 151, which communicates with the tank and trough by means of pipes 152 and 153, respectively. The pump is driven from the counter-shaft by the belt 154 and pulleys 155. Extending through the bottom of the trough, so as to communicate with the underlying tank is an overflow-pipe 156 for the paraffin in the trough. The upper end of this pipe is provided with a screw-section 157, whereby its length may be varied for the purpose of regulating the level of the paraffin in the trough, as required.

Running from end to end of the trough are two parallel bars 158, which are located a suitable distance apart to provide a trackway for the support of the lateral edges of the carrier. The bars are so located that the splints travel above the level of the paraffin in the trough. Arranged within the trough slightly above the paraffin-level and in the path of the splints is a longitudinal pan 159, comprising a bottom 160, with side flanges 162 and slotted back bar 161. The slots in the latter are arranged at intervals apart corresponding with the spaces between the splints in each row, so that while such splints will pass through the slots the splints will practically close the back of the pan. On the under side of the pan is a steam-chamber 163, which is connected with the pipes 150 by means of branch pipes 164, whereby the liquid contents of the pan may be heated. At the forward or open end of the pan is a transverse roller 165, the body of which is submerged in the trough, while the periphery thereof projects above the paraffin-level. This roller is provided at regular intervals with a series of circumferential grooves 166, the bottoms of which revolve adjacent to the bottom of the pan, and the latter is provided on its forward end with a series of fingers 167, (similar to the teeth of a comb, for example,) that project into said spaces. These spaces correspond in number and position with each row of splints, so that the splints may pass freely through the interspaces and into the pan. By this construction it will be seen that owing to the centrifugal force and capillary attraction the paraffin in the trough will be carried in a uniform stream onto and throughout the width of the pan during the rotation of the roller, that in their traverse the splints will pass through and be saturated by the paraffin in the pan, and that as the paraffin is delivered onto the forward end of the pan and discharged at the other end thereof a continuous circulation of the paraffin within the pan and trough will be effected so long as the rotation of the roller is continued. In the present instance the feed-roller is mounted on a transverse shaft 168, having its bearings in posts 169, rising from the bottom of the trough. One end of this shaft carries a gear 170, which coacts with an overlying gear 171 on a driven shaft 172, whereby the roller is properly turned. On the shaft 172 are the fast and loose pulleys 173 174, respectively, either of which may be belted with the main driving-shaft, as it may be desired to stop or operate the feed-roller. The belt is shifted from one pulley to the other by means of the shipper-lever 175, one arm of which is connected with and actuated by a hand-lever 176, which is fulcrumed to a bracket on one of the bars 158. Adjacent to the hand-lever is a notched segment 177, the notches of which are adapted to be engaged by a sliding dog 178 on said lever for the purpose of locking the latter in its positions of adjustment, said dog being connected with and actuated by a suitably-disposed thumb-lever 179 on the hand-lever. (See Fig. 36.)

Referring now to the composition-applying mechanism, 180 denotes a bed-plate provided with transverse guideways 181, to which are fitted flanges on the lower edges of a supporting-frame 182. On this bed-plate is fixed a rack-bar 183, with which engages a pinion 184, whose shaft 185 is mounted in and between the walls of the frame, whereby when said shaft is properly rotated said frame and its appurtenances may be readily drawn outward from or run beneath the carrier, as desired. On this frame is supported a steam-chamber 186, on the walls of which rest the lateral flanges 187 of a composition-box 188, that depends within said chamber, whereby the contents of the box are heated. The steam is introduced to the chamber by way of the steam-pipe 189. The box is centrally supported on the bottom of the steam-chamber by means of a boss 190, which affords a bearing for the upper end of a tubular shaft 191, the lower end of which has its bearings in a depending bracket 192 on the frame. The lower end of the shaft is provided with a bevel-wheel 193, which gears with a corresponding wheel 194 on the inner end of a transverse shaft 195, that has its bearings in brackets 196 on the bed-plate. On the outer end of this shaft is a bevel-wheel 197, which coacts with a similar wheel 198 on a longitudinally-disposed shaft 199, which is connected with and driven from the main driving-shaft. In the present instance that end of the shaft 199 adjacent to the main shaft has its bearings in a pedestal 200 and carries a worm-wheel 201, with which coacts a worm 202 on the main shaft. Hence positive motion is transmitted from the main shaft to the tubular shaft or sleeve 191. To the upper end of this sleeve is affixed a series of radial blades 203, which sweep around the bottom of the composition-box, so as to perform the functions of scrapers and stirrers. Extending through the sleeve is a vertical shaft 204, on the lower end of which is a bevel-wheel 205, which coacts with the wheel 194 on the shaft 195, whereby the vertical shaft is rotated in a contrary direction to the sleeve. On the upper end of this vertical shaft is affixed an eccentric head 206, carrying a series of upwardly-projecting blades 207, which in their eccentric rotation reversely to the lower blades aid still more effectually in stirring and mixing the composition.

In boxes 208 in the walls of the composition-box is journaled a transverse shaft 209, on which is mounted a roller 210, which during its rotation carries the composition into the path of the match-splints, whereby the free ends of the successive rows of splints are tipped with composition or "headed." One end of shaft 209 extends beyond the side of the box and is mounted in a bracket 211, supported on the wall of the underlying steam-chamber. This end of the shaft carries a bevel-wheel 212, which gears with a similar wheel 213 on a vertical shaft 214, which latter shaft has its bearings in the bracket 211 and in a lower bracket 215 on the side of the frame. On the lower end of the shaft is a bevel-wheel 216, which gears with a similar wheel 217 on the shaft 195, above described. By this construction the shaft 209 and the composition-roller are positively driven.

218 is a suitably-valved port in the bottom of the composition-box, whereby the composition may be run out as desired.

As a simple and efficient means whereby the composition shall be uniformly carried by the roller to the splints and also whereby the feeding of the composition may be checked simultaneously with the stopping of the paraffin-applying operation as occasion may require, I arrange in rear of the composition-roller longitudinally thereof a blade 219, that is adapted to be moved against or away from the periphery of the roller, as desired. When the blade is retracted from the roller a predetermined distance, a uniform layer of composition is permitted to pass to the splints; but when the blade is moved against the roller the blade performs the function of a scraper, and thereby prevents the passage of the composition to the splints. In the present instance the blade is carried by two arms 220 on a rock-shaft 221, which has its bearings in the sides of the composition-box. Encircling this shaft near its respective ends are torsional springs 222, that tend normally to raise the rock-arms, and thus maintain the blade retracted from the roller. On each of the arms is a set-screw 223, which, abutting against a suitably-disposed lug 225 on the wall of the composition-box, serves as an adjustable stop to determine the downward movement of the arm. Rising from this lug is a screw 224, which extends through a perforated lug on the adjacent arm and is provided with a set-nut against which said latter lug abuts when the arm is raised, thereby providing an adjustable stop to limit the upward movement of the blade.

Fulcrumed to the side of the composition-box is a lever 226, one arm of which projects upward and is connected with the hand-lever 176, above described, by means of a link 227, while the other arm, 226$^a$, extends forwardly and inwardly, so as to engage the adjacent rock-arm. The link is connected with the lever 226 by means of a pin-and-slot connection 228, which is so arranged that when the hand-lever is swung forward to shift the belt from the fast pulley 173 to the loose pulley 174 the lever is actuated to depress the connected rock-arm, and thus force the blade toward or against the periphery of the composition-roller. When the lever 176 is thrown backward to shift the belt onto the fast pulley, the lever 226, being free in the pin-and-slot connection, permits the rock-arm and the blade to return to their normal position.

Loosely mounted on the roller-shaft 209 adjacent to the pinion 212 thereon is a spur-wheel 229, on the hub of which is a bevel-gear 230, that coacts with the gear 213 on the vertical shaft 214, whereby said spur-wheel is positively driven. This spur-wheel is interposed between and geared with two corresponding wheels 231, mounted on transverse shafts 232, having their bearings in lateral boxes on the composition-box, whereby said shafts are simultaneously driven in the same direction. On each of these shafts are suitably located spur-wheels 233, which coact with the overlying rack-bar on the carrier in a manner to impel the latter onward with sufficient speed to effect the separation of the plates. The wheels 231 are adjustably mounted on their respective shafts, so that said wheels may be minutely adjusted in respect to the teeth of the interposed gear 229 to insure absolutely uniform movement of the carrier by the gears 233. In this instance the wheels are loosely mounted on the shafts 232 and are provided each with two laterally-projecting lugs 234, between which extends a spud 235, which is keyed fast to the shaft 232. In the lugs are fitted screws 236, which take against the respective sides of the spud, so that by properly manipulating the screws accurate adjustment of the spur-wheel may be had.

The sides of the carrier are supported and guided in suitably-located guideways on or above the composition-box, which ways comprise longitudinal rails 237, offset on their inner sides for the support of the lateral edges of the plates and provided with cap-bars 238, which extend over the lateral coupling-pieces on said plates. The cap-bars are detachable, so as to permit the carrier-plates to be raised or removed, as necessity may require. To this end said bars are provided on their under sides with ribs 239, which register with corresponding grooves in the rails, and said bars are provided with laterally-open slots 240, through which extend the set-screws 241, by means of which the bars are bolted to the respective rails. By loosening the screws the rails may be bodily raised from engagement with the underlying grooves and then be removed bodily inward free from the rails.

The splints headed with composition, as above described, are carried into and through the drying-chamber, the carrier passing around suitably-arranged guide-wheels exteriorly and interiorly of the chamber. This chamber comprises a brick structure provided on its inner end with an opening 242, at the mouth of which is supported a coil of steam-pipes 243. Extending into the bottom of the structure is an exhaust-pipe 244, leading to the fan, whereby a steady current of fresh air is maintained within the chamber, for as the air is exhausted by way of the pipe 244 a current enters the inlet and is heated on its passage by contact with the opposing steam-pipes.

A suitable framework 245 is arranged within the chamber, and the guide-wheels are mounted therein in rows near the top and bottom of the chamber, the carrier being guided in a sinuous course around the upper and lower wheels in alternate succession, then returned along the top of the chamber through an opening 246, thence to and around the guide-wheels at the opposite end of the circuit. One (or more) of the wheels in the drying-chamber is positively driven to insure the travel of the carrier. To this end the shaft of said wheel is equipped with a worm-wheel 247, with which coacts a worm 248 on the upper end of a vertical shaft 249, the lower end of said shaft being provided with a bevel-wheel 250, which gears with and is driven by a similar wheel 251 on the driven shaft 199, above described. The wheels in their preferred form each comprise two skeleton side sections 252, connected and held a suitable distance apart by transverse tie-rods 253. On the inner side of the sections is a series of octagonally-arranged ledges or flanges 254, which constitute supports for the edges of the respective plates. The flanges of the upper series of wheels are provided at their ends with inwardly-projecting tooth-sections 255, which are situated to mesh with the rack-teeth on the plates, thereby preventing the plates from sliding end to end on the wheels and insuring the steady and uniform advancement of the carrier. It is essential that the adjacent ends of the plates be kept separated while the carrier rounds the wheels; otherwise the inwardly-converging splints on or near said ends would come together with disastrous results. For the same purpose as the teeth on the upper wheels the flanges 254 on the lower wheels $B^2$ are provided with suitably-located studs $255^\times$, which engage the shouldered ends of the side bars on the respective plates. The slight variance in the construction of the upper and lower wheels is necessitated by the engagement thereof with the opposite sides of the carrier during its travel.

The matches are carried around to the discharging mechanism H, whereupon, being thoroughly dried, they are ejected row by row from the carrier. This mechanism is of the following description: 256 denotes a transverse drum mounted on a shaft 257 directly above the carrier, so as to roll in contact with the latter, or substantially so. The periphery of the drum is provided with parallel rows of projecting studs 258, which are constructed and arranged to gear or register with the successive rows of perforations in the carrier during its onward movement, so as to express therefrom the matches row by row. The shaft has its bearings in boxes 259, which are supported by a substantial frame 260. One end of the shaft projects out beyond the frame and carries a bevel-wheel 261, which gears with a similar wheel 262 on the upper end of a vertical shaft 263, having its bearings in brackets 264. The lower end of shaft 263 carries a bevel-wheel 265, which coacts with a like wheel 266 on a longitudinal shaft 267, which is connected with and driven from the main driving-shaft similarly to the shaft 199, above described—that is to say, that end of the shaft adjacent to the main shaft is borne in a pedestal 268 and carries a worm-wheel 269, with which engages a worm 270 on the main shaft. On the projecting portion of the roller-shaft 257 is fixed a spur-wheel 271, which gears with two corresponding wheels 272 on the adjacent ends of a pair of lower parallel transverse shafts 273, which have their bearings in the sides of frame 260, whereby the latter shafts are driven in concert. On each of these shafts 273 are two suitably-arranged spur-wheels 274, which coact with the overlying rack on the carrier in a manner to drive the latter. The wheels 272 are adjustably mounted on their respective shafts similarly to and for a like purpose as the wheels 231, above described. The frame is provided, similarly to the composition-box, with longitudinal guideways in which the edges of the carrier are guided and supported during its traverse.

Beneath the carrier, directly in advance of the plane in which the matches are expressed therefrom by the studded drum, is a freely-revoluble roller 275, (block or the like,) which supports the carrier against the thrust or pressure of the drum. The matches when expressed fall upon an underlying apron 276. This apron carries the matches forwardly and deposits them row by row in a train of match-trays 277 on a transversely-extending belt 278 in the usual manner. In this instance the apron turns on a loose roller or sleeve 279 on the rearward shaft 273 and is driven by a transverse shaft 280 from the shaft 267, with which it is geared by means of a belt 281 and pulleys 282. On the shaft 280 is a worm 283, which gearing with a worm-wheel 284 on an underlying shaft 285 actuates said latter shaft and a pulley 286 thereon. The tray-carrying belt passing around this pulley is continuously driven thereby, so as to feed the trays thereon into position to receive the splints row by row from the apron.

I preferably, though not essentially, arrange in rear of the studded roller 256 a block 287, which bears upon the carrier and serves as a drag therefor. In the present case the block is provided on its under side with leather 288 or other good frictional material and is provided with lateral shoulders 289, that abut against the opposing ends of the guideways for the carrier. (See Figs. 49 and 50.)

The general operation of the machine above described may be briefly stated as follows: Power being applied to the driving-pulley $21^a$, the attendant pulls the hand-lever 25 in a manner to lock the pulley to the main shaft, and thereby start the machine. Blocks of wood are supplied to the hopper and fed thereby to the path of the cutter-head, which, together with the chambered structure 37, is vertically reciprocated by the eccentric connection with the main shaft. In the downstroke of the cutter-head the cutters thereon sever a row of splints from the blocks, the cutters at the lower end of the stroke surrounding the studs, so as to free the splints. At this stage the port 50 is open, and hence the air is being exhausted from the chamber, in consequence of which the splints thus freed are drawn into the pockets of said chamber with their lower ends resting upon the shanks of the cutters. In the upward stroke of the cutter-head these splints are carried upward thereby and their upper ends punched into a row of holes in the overlying carrier, at which time the port 50 is closed, so as to cut off the air-exhaust from said chamber. In the descent of the cutter-head about midway of its stroke the bar 65 is projected into the slotted pockets of the chamber, so as to eject slivers, &c., therefrom, and at the same time the port 55 is open, so as to permit therethrough a current of air, which draws such slivers, &c., from the pockets and discharges them by way of the fan. During a portion of the ascent and descent of the cutter-head the port 54 is opened, so as to permit the clearance of debris from the chamber 56. The carrier is continuously advanced, so that in each upward stroke of the cutter-head a fresh row of holes is presented to the new row of splints. As the plates in the carrier approach the splint-inserting mechanism they are moved end to end through the action of the differential gearing to insure the end rows of holes in the adjoining plates while crossing such mechanism being brought into proper alinement with the successive rows of splints. The plates with the depending splints therein thus pass onward through the box 109, wherein the rotating brushes engage the splints and brush the dust, &c., therefrom, such dust being discharged by means of the fan. Thence the plates pass under the yielding punches in the reciprocating cross-head, which punches in their reciprocations act upon the upper ends of the successive rows of splints in the carrier, so as to eject from the latter into the waste-box those short or imperfect splints that are unsupported by the underlying cross-bar 144. When the plates leave the punching mechanism, they are separated through the action of the gearing 233 and the splints carried thereby into and through the paraffin-pan, in which may be kept up a continuous circulation of paraffin by the feed-roller, so as to saturate the splints. This roller and perforce the feeding of the paraffin may be thrown into or out of operation, as desired, by the shifting of the belt onto either the fast pulley 173 or the loose pulley 174. The plates, with the splints, are carried from the paraffin-pan toward and over the rotating composition-roller, which in its rotation carries the composition from the composition-box into the paths of the lower ends of splints. Thus the latter are headed. The layer of composition carried by the roller may be nicely regulated by adjusting the blade 219, or the feed may be entirely cut off by moving the blade against the periphery of the roller. When the shipper-lever is operated to throw the paraffin-feed roller out of operation, the connection between said lever and the blade effects the movement of the blade against the roller, so as to check the paraffin and composition feeds simultaneously. The plates, with their matches, pass into the drying-chamber and around the supporting and guiding wheels therein, thence returning from the chamber to and around the guide-wheels at the opposite end of the apparatus. At this stage the matches are thoroughly dried. The plates then pass below the rotating drum, the peripheral studs of which register with the successive rows of holes in the carrier in a manner to eject the matches therefrom row by row. These matches fall upon the underlying apron 276, which carries them forwardly and deposits them row by row in the train of match-trays 277 on the belt 278. The plates then pass to the splint-inserting mechanism for a succeeding operation.

It will be seen that in the form of embodiment of my invention herein illustrated and described the continuously-moving carrier comprises a series of flexibly-connected plates having rows of rigid-walled apertures into which the splints are inserted as rapidly as they are formed, that the splint forming and inserting means permits the movement of the splints with the carrier during their insertion into the apertures, and that the means for ejecting the finished matches from the carrier permits the movement of the matches with the carrier during their removal therefrom.

I claim as my invention—

1. The combination of a splint-carrier, means for cutting the splints and leaving them free, supporting and operating means therefor, and means whereby the splints are moved bodily sidewise with their ends resting on an abutment.

2. The combination of a splint-carrier, cutters, supporting and operating means therefor, means whereby the splints are freed from the cutters at the end of the cutting stroke, and means whereby the splints are moved bodily sidewise with their ends resting on an abutment.

3. The combination of a splint-carrier, a reciprocating cutter-head, means for cutting the splints and leaving them free, and means whereby the splints are laterally moved bodily upon an abutment, whereby in the stroke of the cutter-head toward the carrier the splints are thrust into the carrier.

4. The combination of a splint-carrier, a reciprocating cutter-head, means for cutting the splints and leaving them free, and means whereby the splints as they are produced are moved upon the shanks of the cutters, whereby during the stroke of the cutter-head said splints are introduced to the carrier.

5. The combination of a splint-carrier, a reciprocating cutter-head, means for cutting the splints and leaving them free, a pneumatic device arranged to shift the splints laterally upon an abutment whereby during the stroke of the cutter-head said splints are introduced to the carrier.

6. The combination of a reciprocating cutter-head, means for cutting the splints and leaving them free, a hollow transfer or feed device the forward face of which is arranged directly above and in rear of the working ends of the cutters, means for exhausting air from said device to the end that the row of splints will be drawn laterally thereto from the cutter ends, a splint-carrier, and means whereby the splints in said device are engaged with said carrier.

7. The combination of a reciprocating cutter-head, means for cutting the splints and leaving them free, a hollow transfer or feed device mounted on said head directly above and in rear of the working ends of the cutters, means for exhausting air from said device to draw the splints thereto and upon the shanks of the cutters, and a carrier to which said splints are introduced.

8. The combination of a splint-carrier, a reciprocating cutter-head, means for cutting the splints and leaving them free, a chambered structure arranged in proximity to the said cutters, and means for producing a current of air in said structure whereby the splints as they are cut are moved beyond the cutting ends of the cutters so that during the stroke of the cutter-head said splints are introduced to the carrier.

9. The combination of a splint-carrier, a reciprocating head, a cutter-bar thereon, means for cutting the splints and leaving them free, a transfer or feed device imposed on said cutter bar and head, means for reciprocating said head, and means for exhausting air from said device.

10. The combination of a source of splint-supply, a reciprocating head provided with a chambered structure having a series of pockets to receive the splints laterally and support them in parallelism, said pocket having openings or slots therein, means for exhausting air from said structure, and valve mechanism for controlling the air-exhaust.

11. The combination, with a source of splint-supply, of a chambered structure having therein a series of slotted or perforated pockets to receive the splints laterally and support them in parallelism, an air-exhaust device connected with said structure, valve mechanism for opening and checking the exhaust at certain intervals, and a splint-carrier to receive the splints in said pockets.

12. The combination, with a source of splint-supply, of a chambered transfer or feed device the front of which is constructed and arranged to receive the splints laterally and support them in parallelism, a hollow casing opening into said device and forming a back therefor, and means for exhausting air from said casing.

13. The combination, with a source of splint-supply, of a chambered transfer or feed device, the front of which is constructed and arranged to receive the splints laterally and support them in parallelism, means for supporting and reciprocating said device, a casing opening into said device and forming a back therefor, and means for exhausting air from said casing.

14. The combination, with a reciprocating cutter-head carrying a row of cutters, of a chambered transfer or feed device on said head, the front of which device is arranged in close relation to the cutters and constructed to receive and hold the splints laterally and in parallelism as they are produced, a hollow casing fixed on said head and opening into the back of the said device, and means for exhausting air from said casing.

15. The combination, with a reciprocating cutter-head carrying a row of cutters, of a hollow transfer or feed device constructed to receive and hold the splints laterally and in parallelism as they are produced, a chamber located below the cutters to receive the chips, slivers, &c., resulting from the cutting operation, pneumatic means having connections with said device and chamber, and valve mechanism for controlling the connection with said device.

16. The combination, with a source of splint-supply, of a hollow transfer or feed device constructed to receive and hold the splints laterally and in parallelism, a chamber forward of said device and opening into the path thereof, and means for exhausting air from said device and chamber at predetermined intervals.

17. The combination, with a source of splint-supply, of a transfer or feed device constructed to receive and hold the splints laterally and in parallelism, a chamber forward of said device and opening into the path thereof, air-exhaust means having connections with said device and chamber, and valve mechanism for opening and closing said connections at predetermined intervals.

18. The combination of a source of splint-supply, a splint-carrier, a transfer or feed device having provision for the reception of splints, mechanism for reciprocating said device, a clearer on said device, and operative connections between said mechanism and the clearer, whereby the clearer is independently actuated during the reciprocations of said device.

19. The combination, with a chambered structure having a slotted or perforated splint receiving and retaining portion, and means for exhausting air from said structure to draw the splints laterally thereto and maintain them in parallelism, of a clearing device adapted to enter the slots or perforations in said structure.

20. The combination, with a source of splint-supply, of a transfer or feed device provided with slotted or perforated pockets for the reception of splints, an air-exhaust device connected with said pockets, and means in rear of said pockets to enter and clear the same at intervals.

21. The combination, with a source of splint-supply, of a transfer or feed device provided with a slotted or perforated splint receiving and retaining portion, a reciprocating clearer in said device, and means for reciprocating said clearer.

22. The combination, with a source of splint-supply, of a transfer or feed device provided with a slotted or perforated splint-receiving portion, an exhaust device connected with said portion, a clearer arranged within said device, and means for periodically moving the clearer into and retracting it from the said slotted or perforated portion.

23. The combination, with a source of splint-supply, of a transfer or feed device provided with a slotted or perforated splint-receiving portion, an exhaust device connected with said portion, a studded or toothed bar in said device adapted to coact with such portion, and means for reciprocating said bar.

24. The combination of a source of splint-supply, a splint-carrier, a cutter-head, a transfer or feed device provided with a slotted or perforated splint-receiving portion, an air-exhaust connected with said device, and a clearer for said device.

25. The combination of a source of splint-supply, a splint-carrier, a reciprocating cutter-head with a row of cutters, a chambered structure on said head provided with a series of slotted or perforated splint receiving and retaining pockets corresponding in number and position with the cutters, means for exhausting air from said structure, means for reciprocating said head, a clearing device in said structure, and means for operating said device during the reciprocation of the cutter-head.

26. The combination, with a source of splint-supply, of a transfer or feed device provided with a slotted or perforated splint-receiving portion, a reciprocating head on which said device is mounted, a connecting-rod for said head, means for operating said rod, clearing means in said head, and operative connections between said rod and clearing means.

27. The combination, with a source of splint-supply, of a transfer or feed device provided with a slotted or perforated splint-receiving portion, a toothed or studded bar adapted to coact with said portion, a reciprocable spring-controlled rod in said head, lever-and-link connections between said rod and bar, a connecting-rod with which the first-named rod is engaged, and means for operating said connecting-rod.

28. The combination, with a source of splint-supply, and a carrier embodying a series of sections having their adjacent ends flexibly connected by means permitting relative longitudinal movement, of means for moving said plates in end-to-end contact, or substantially so, during a part of their traverse, and for separating them at another part of their traverse.

29. The combination, with a source of splint-supply, and a continuously-driven carrier embodying a series of connected sections whereby the connections permit independent longitudinal movement, of means for moving one or more sections at a slow rate of speed, and means for moving the rearward section or sections at a higher rate of speed, whereby said latter section or sections are moved into contact, or substantially so, with the forward section or sections.

30. The combination, with a source of splint-supply, and a carrier embodying a series of sections connected at adjacent ends by slotted links so as to be movable independently toward and from each other, of differential-speed mechanism for actuating said sections and moving them into end-to-end contact, or substantially so, during a part of their traverse, and for separating them at another part of their traverse.

31. The combination, with a source of splint-supply, of a carrier embodying a series of perforated sections wherein the perforations in each section are formed in equidistant parallel rows, the end rows being so arranged that when two adjoining sections are brought end to end, or substantially so, the distance between the adjacent end rows is equal to that between the adjacent rows in the body of the section, connections between said sections permitting their relative longitudinal movement, means whereby the sections are moved together during a part of their traverse, and means whereby they are subsequently separated.

32. The combination, with a source of splint-supply, of a carrier embodying a series of flexibly-connected sections whereof the connections permit relative longitudinal movement of the sections, said sections having provisions to receive the splints and having on their lateral edges longitudinal racks, the end teeth whereof are so disposed that when two adjoining sections are brought together the continuity of the racks is preserved, gear-wheels meshing with said racks, and means whereby said wheels are operated so as to impel the carrier, and during its traverse to move said sections into and out of contact with and from each other at predetermined intervals.

33. The combination, with a source of splint-supply, and a carrier composed of sections flexibly connected by means permitting relative longitudinal movement having splint-receiving portions and racks, of shafts carrying gear-wheels coacting with said racks to impel parts of the carrier at relatively different speeds, worm-gearing operatively connected with said shafts, and means for driving said worm-gearing.

34. The combination, with a splint-carrier, and a source of splint-supply therefor, of a chamber in the path of the splints in the carrier, a brush in said chamber to engage the splints while in the carrier, and pneumatic connections with said chamber.

35. The combination, with a splint-carrier, and a source of splint-supply therefor, of a chamber in the path of the splints in the carrier, rotary brushes in said chamber to engage the splints while in the carrier, and means for rotating said brushes.

36. The combination, with a splint-carrier, and a source of splint-supply therefor, of a chamber in the path of the splints in the carrier, rotary brushes in said chamber to engage the splints while in the carrier, means for rotating the brushes, and pneumatic connections with said chamber.

37. The combination, with a splint-carrier and a source of splint-supply therefor, of mechanism for ejecting broken or short splints from said carrier including means for preventing the ejectment of the whole or unbroken splints therein.

38. The combination, with a splint-carrier, and a source of splint-supply therefor, of a series of spring-controlled punches adapted to eject broken or defective splints from the carrier, and means for supporting and actuating said punches at predetermined intervals, together with means for preventing the ejectment of whole or unbroken splints by said punches.

39. The combination, with a splint-carrier, and a source of splint-supply therefor, of a support for the free ends of whole splints in the carrier, and a movable punch mechanism to act upon the splints in the carrier and to expel short or insufficiently-supported splints therefrom.

40. The combination, with a splint holder or carrier, of devices for acting upon the splints therein, and means for counteracting the thrust or impact of said devices on whole or unbroken splints in said holder or carrier.

41. The combination, with a carrier and a source of splint-supply therefor, of a reciprocating punch-head, and its supporting and operating parts, independently-movable spring-controlled punches in said head to engage the splints in the carrier, and means to counteract the thrust of said punches on whole or unbroken splints.

42. The combination of a carrier having rows of splint-receiving perforations, a source of splint-supply therefor, a reciprocating punch-head and its supporting and operating parts, a row of normally projecting punches in said head to engage the successive rows of splints in the carrier, and means to counteract the thrust of said punches on whole or unbroken splints.

43. The combination of a splint-carrier, a source of splint-supply therefor, a reciprocating cross-head adjacent to the carrier, a shaft, cams thereon, operative connections between said cams and the cross-head, a gang of normally projecting spring-controlled punches in said head to engage the splints in the carrier, and means to counteract the thrust of said punches on whole or unbroken splints.

44. The combination of a splint-carrier having parallel rows of splint-receiving perforations, a source of splint-supply therefor, a cross-head, parallel rows of spring-controlled punches therein staggered to engage the splints as described, means for reciprocating said cross-head toward and from the carrier, and means to counteract the thrust of said punches on whole or unbroken splints.

45. The combination, with a splint-carrier, and a source of splint-supply therefor, of mechanism embodying plunger and counter-thrust devices for ejecting broken or defective splints from the carrier, without ejecting whole or unbroken splints therefrom, a chamber to receive such ejected splints, and pneumatic connections with said chamber adapted to carry off the ejected splints.

46. The combination of a splint-carrier, a source of splint-supply therefor, a punch-carrying head adjacent to the carrier, a shaft, cams thereon, operative connections between said cams and the head, a means to counteract the thrust of the punches in said head on whole or unbroken splints in the carrier, and gearing intermediate said shaft and the carrier.

47. The combination with a carrier adapted to carry transverse rows of splints, of a pan below the same comprising a bottom, sides and vertically-slotted end, and means to supply paraffin to said pan, whereby the splints will pass through the paraffin on the pan and through the slots in the end of the pan.

48. The combination, with a splint-carrier, and its supporting and operating parts, of a paraffin-containing trough, a pan provided with fingers at one end thereof, a circumferentially grooved or pocketed roller coacting with said fingers, and means to rotate said roller.

49. The combination, with a splint-carrier, and its supporting and operating parts, of a paraffin-containing trough, a pan therein comprising a bottom, sides and slotted end, means to raise the paraffin onto said pan, whereby the splints will pass through the paraffin on said pan and through the slotted end of the pan.

50. The combination, with a carrier and its supporting and operating parts, said carrier being adapted to carry rows of splints, of a paraffin-containing trough, a pan adjacent thereto provided with fingers at one end thereof and with vertical slots at the opposite end, a circumferentially grooved or pocketed roller coacting with said fingers, and means to rotate said roller.

51. The combination, with a carrier and its supporting and operating parts, of a paraffin-containing vessel, a pan therein, a rotary feeder for raising the paraffin onto and throughout the width of said pan and into the path of the splints, drive means for said feeder, stopping mechanism therefor, a composition-box, a feed-roller therein, a regulating-blade therefor, and operative connections between said blade and the said stopping mechanism.

52. The combination, with a carrier, and its supporting and operating parts, of a composition-box, a feed-roller, means for actuating said roller, a rock-shaft, arms thereon, a blade on said arms, a torsional spring on the shaft to maintain the blade normally raised, and means whereby the blade is depressed against the action of the spring.

53. The combination, with a carrier, and its supporting and operating parts, of a paraffin-containing vessel, a feeder therein for raising the paraffin into the path of the splints, means for operating the same, a lever operatively connected with said means and adapted to throw the same into and out of action, a composition-box, a feed-roller therein, a regulating-blade for said roller, and operative connections between said blade and the said lever.

54. The combination, with a supporting-frame, of a steam-chamber thereon, a composition-box depending in said chamber, a tubular shaft extending through the bottom of said box, stirrers on said shaft, a central shaft within the tubular shaft, stirrers on said central shaft, and means for rotating said shafts in opposite directions to each other.

55. The combination, with an endless carrier made up of a series of flexibly-connected sections, provided with racks, and means for relatively moving said sections longitudinally of supporting and guiding wheels for said carrier having toothed sections which engage said racks at or near the ends of the respective sections and maintain the sections open or apart.

56. The combination, with an endless carrier made up of a series of flexibly-connected sections, provided with racks, of supporting and guiding wheels for said carrier comprising side members connected and held apart by tie-rods, and provided with ledges or flanges which afford supports for the edges of the respective sections, said ledges or flanges being provided with toothed sections that mesh with the racks.

57. The combination, with an endless carrier, made up of a series of flexibly-connected sections having shouldered side bars, of supporting and guiding wheels for said carrier having studs which engage the shoulders in said bars.

58. The combination, with a carrier made up of a series of flexibly-connected sections provided with racks and shouldered side bars, of two series of supporting and guiding wheels for said carrier, one of which is provided with studs which engage the shoulders in the side bars, and the other of which is provided with toothed sections which engage the racks.

59. The combination of a splint-carrier, means for cutting the splints and leaving them free, supporting and operating means therefor, means whereby the freed splints are moved bodily sidewise, and means whereby they are introduced to the carrier.

60. In a match-making machine, in combination with a reciprocating head having a portion fixed relatively thereto provided with a series of splint-receiving grooves in its front face, and means for supporting one end of the splints, while the latter are in such grooves, an exhaust-trunk adapted to draw the air rearward between the splints, so as to cause them to be pressed into the grooves, and an air-exhausting device connected with the trunk, substantially as and for the purpose shown.

61. In a match-making machine, in combination with the splint cutting and setting head, carrying a series of splint-cutters, and having a portion fixed relatively thereto provided with a series of grooves to receive the cut splints, an air-exhausting device, and an exhaust-trunk connected therewith, arranged with reference to the cutting and setting head so that the air drawn into it will pass between the splints cut by the cutters, in a direction to press the splints toward and into the grooves, substantially as and for the purpose described.

62. In a match-making machine, in combination with the splint cutting and setting head including a relatively fixed setting member whereof the front face is provided with splint-receiving grooves above which the upper ends of the splints extend, and means for supporting the lower ends of the splints while the latter are in such grooves, an exhaust-trunk adapted to draw the air rearward between the splints, so as to cause them to be pressed into the grooves, and an air-exhausting device connected with the trunk, substantially as described.

63. In a match-making machine, in combination with the splint cutting and setting head including a series of splint-cutters and a relatively fixed setting member whereof the front face is provided with splint-receiving grooves above which the upper ends of the cut splints extend, an air-exhausting device, and an exhaust-trunk connected therewith, arranged with reference to the cutting and setting head so that the air flowing to the exhaust-trunk will press the splints into the grooves, substantially as described.

64. In a match-making machine, in combination with a reciprocating head including a relatively fixed member provided with a series of splint-receiving grooves in its front face and means for supporting one end of the splints while the latter are in such grooves, an exhaust-trunk adapted to draw the air between the splints and rearward past such member so as to cause the splints to be pressed into the grooves, and an air-exhausting device connected with the trunk, substantially as described.

65. In a match-making machine, in combination with the splint-carrier, provided with relatively fixed means to receive and hold the splints, a head moving toward and from the carrier having a member provided with a series of splint-receiving grooves, and an abutment for one end of the splints, a source of supply of splints, an air-exhausting device, and an exhaust-trunk connected therewith, and having its mouth situated to draw the air from the front of the member and rearward past the same, substantially as described.

66. In a match-making machine, in combination with the splint cutting and setting head including a series of splint-cutters and a relatively fixed member having a series of splint-receiving grooves adjacent the cutters, an air-exhausting device, and an exhaust-trunk connected therewith, arranged with reference to the said member so that the pressure of air flowing to the exhaust-trunk will hold the splints in the said splint-receiving grooves, substantially as described.

67. In a match-making machine, in combination with the splint cutting and setting head including a series of splint-cutters and a relatively fixed member provided with a series of grooves to receive the cut splints, an air-exhausting device, and an exhaust-trunk connected therewith, arranged in rear of the said member so that the air drawn into the trunk will pass between the splints cut by the cutters in a direction to press the splints toward and into the grooves, substantially as described.

68. The combination with a source of splint-supply, of a splint-carrier embodying a series of sections having their ends connected by means permitting relative longitudinal movement.

69. The combination with a source of splint-supply, and a splint-carrier embodying a series of independently-movable sections, of gearing for continuously moving the carrier during a part of its traverse at one rate of speed, and gearing for continuously moving the carrier during another part of its traverse at a reduced rate of speed.

70. The combination with a match-carrier comprising a series of separated flexibly-connected match-plates provided with gear-racks, of gearing coacting with said racks for gradually and continuously moving said plates to bring them into end-to-end contact.

71. The combination with a match-carrier comprising a series of separated flexibly-connected match-plates provided with gear-racks, of gearing coacting with said racks for gradually and continuously moving said plates to bring them into end-to-end contact, and means for again separating said plates.

72. The combination with a source of splint-supply, of a splint-carrier composed of flexibly-connected perforated sections, whereof each section is movable independently of the other, and means for moving said sections continuously and independently of each other.

73. The combination with a continuously-moving perforated splint-carrier, made up of a series of loosely-connected sections, of means for causing a separation of said sections at predetermined intervals, and means for gradually and continuously moving the sections into contact.

74. The combination with splint cutting and inserting mechanism, of a continuously-moving perforated carrier having separated portions therein approaching such mechanism, means for positively closing such portions before they reach the inserting position, and means for separating such portions of the carrier after they have passed such position.

75. The combination with a splint-carrier, having rows of rigid walled apertures therein, of mechanism for cutting match-splints and sticking them in said carrier, and means for causing said carrier to travel across the said mechanism while the latter is sticking splints in the carrier.

76. The combination with a splint-carrier, having rows of rigid walled apertures and means for continuously moving the same, of a cutter-head reciprocable toward and from the carrier at right angles thereto, and means for reciprocating said head at predetermined intervals in respect to the continuous movement of the carrier whereby the splints cut by said head are inserted in the carrier and permitted, during their insertion, to move with the carrier.

77. The combination with a splint-carrier, having rows of rigid walled apertures and means for continuously moving the same, of a reciprocating cutter-head adapted in its downward stroke to cut a row of splints from a block, means for laterally moving from the block the row of cut splints, and means for inserting the said splints in the carrier while the carrier is in motion.

78. The combination with a continuously-moving splint-carrier, having rigid walled apertures, of a reciprocating cutter-head adapted in each reciprocation thereof to cut a row of splints and insert them in a row of perforations in the moving carrier, a main driving-shaft, and gearing between the same, the carrier and the cutter-head whereby said carrier and cutter-head are operated synchronously.

79. The combination with a traveling splint-carrier, of a head reciprocable in a fixed path, and carrying cutters adapted always to cut in a fixed path, means for feeding stock to said cutters for the production of match-splints, and means for sticking the said splints into the carrier in a path parallel to the direction of movement of the head and its cutters but out of the path of said cutters.

80. The combination with a source of splint-supply, a splint-carrier composed of a series of flexibly-connected plates, having rows of rigid walled apertures and mechanism for ejecting splints from said carrier, of means for continuously moving the carrier past the source of splint-supply, and means for continuously moving said carrier across the path of the ejecting mechanism.

81. The combination with a source of match-supply, of match receiving and holding plates, means for moving said plates to the source of match-supply, means for actuating said plates independently of each other, and means for ejecting the splints from said plates.

82. In a match-machine, the combination with a continuously-moving match-carrier, a series of flexibly-connected sections having rows of rigid walled apertures, of devices for engaging the matches to remove them from the carrier, and means for supporting and actuating said devices, whereby the latter are moved in the direction of motion of the carrier and back again.

83. In a match-machine, the combination with a continuously-moving carrier comprising flexibly-connected plates having therein rigid walled apertures, of splint forming and inserting means permitting the movement of the splints with the carrier during their insertion, and match-ejecting means permitting the movement of the matches with the carrier during their removal.

84. In a match-machine, the combination of an endless carrier comprising a series of flexibly-connected plates, each of which is provided with equally-spaced parallel rows of perforations, the distance between the adjacent rows of adjoining edge-to-edge plates being equal to that between adjacent rows in the body of a plate, and gearing for continuously driving said carrier throughout its entire length together with splint forming and inserting means permitting the movement of the splints with the carrier during their insertion, and match-ejecting means permitting the movement of the matches with the carrier during their removal.

85. In a match-machine, the combination with a continuously-moving carrier comprising a series of flexibly-connected plates having rows of rigid walled apertures, of splint forming and inserting means permitting the movement of the splints with the carrier during their insertion.

In testimony whereof I have hereunto affixed my signature in the presence of two subscribing witnesses.

JOSEPH C. DONNELLY.

Witnesses:
ANDREW V. GROUPE,
JOHN R. NOLAN.